United States Patent
Mentese et al.

(10) Patent No.: US 10,095,942 B2
(45) Date of Patent: Oct. 9, 2018

(54) VISION BASED REAL-TIME OBJECT TRACKING SYSTEM FOR ROBOTIC GIMBAL CONTROL

(71) Applicant: Reflex Robotics, Inc., Palo Alto, CA (US)

(72) Inventors: Enes Mentese, Santa Cruz, CA (US); Seongdo Kim, Seoul (KR); Abdo Babukr, Oakley, CA (US)

(73) Assignee: Reflex Robotics, Inc, Palo Alto, CA (US)

( * ) Notice: Subject to any disclaimer, the term of this patent is extended or adjusted under 35 U.S.C. 154(b) by 57 days.

(21) Appl. No.: 14/968,892

(22) Filed: Dec. 14, 2015

(65) Prior Publication Data
US 2016/0171330 A1    Jun. 16, 2016

Related U.S. Application Data

(60) Provisional application No. 62/092,097, filed on Dec. 15, 2014.

(51) Int. Cl.
| | |
|---|---|
| *G06K 9/32* | (2006.01) |
| *G06T 7/20* | (2017.01) |
| *H04N 5/232* | (2006.01) |
| *G01S 3/786* | (2006.01) |

(52) U.S. Cl.
CPC .......... *G06K 9/3233* (2013.01); *G01S 3/7864* (2013.01); *G06T 7/20* (2013.01); *H04N 5/2328* (2013.01)

(58) Field of Classification Search
CPC .................................. G06T 7/10; G06T 7/20
See application file for complete search history.

(56) References Cited

U.S. PATENT DOCUMENTS

| | | | | |
|---|---|---|---|---|
| 7,764,808 | B2* | 7/2010 | Zhu | G06K 9/3241 382/103 |
| 2006/0045381 | A1* | 3/2006 | Matsuo | H04N 19/139 382/276 |
| 2014/0336848 | A1* | 11/2014 | Saund | G08G 1/054 701/3 |
| 2015/0219981 | A1* | 8/2015 | Roberts | G03B 17/561 348/375 |

OTHER PUBLICATIONS

Dalal et al., Histograms of Oriented Gradients for Human Detection.
Henriques et al. High-Speed Tracking with Kernelized Correlation Filters.

* cited by examiner

*Primary Examiner* — James M Pontius
*Assistant Examiner* — Kyle M Lotfi
(74) *Attorney, Agent, or Firm* — Chhabra Law Firm, PC

(57) ABSTRACT

Using various embodiments, methods, systems, and apparatuses for controlling a camera pivoting device (e.g., mechanical gimbal) are described. In one embodiment, the system comprises a main computing device, a gimbal stabilizer controller, and a computer vision camera, and/or a user camera. The system is able to track a target object using the computer vision camera even while the target object is moving, the base of the pivoting device is moving (e.g., when a user controlling the camera moves), or a combination of thereof. The camera pivoting device of the embodiments disclosed herein can be mounted on to any number of devices/objects that can provide mobility and/or transportation.

20 Claims, 27 Drawing Sheets

Level/Neutral Position

Roll Right

Roll Left

Level/Neutral Position

Pitch or Tilt Up

Pitch or Tilt Down

Level/Neutral Position

Yaw or Pan Right

Yaw or Pan Left

900

Level/Neutral Position

Base Rolls Right; Pivoting Device Rolls Left

Base Rolls Left; Pivoting Device Rolls Right

Level/Neutral Position

Base Pitches Down; Pivoting Device Pitches Up

Base Pitches Up; Pivoting Device Pitches Down

Level/Neutral Position

Base Yaws Left; Pivoting Device Yaws Right

Base Yaws Right; Pivoting Device Yaws Left

1000

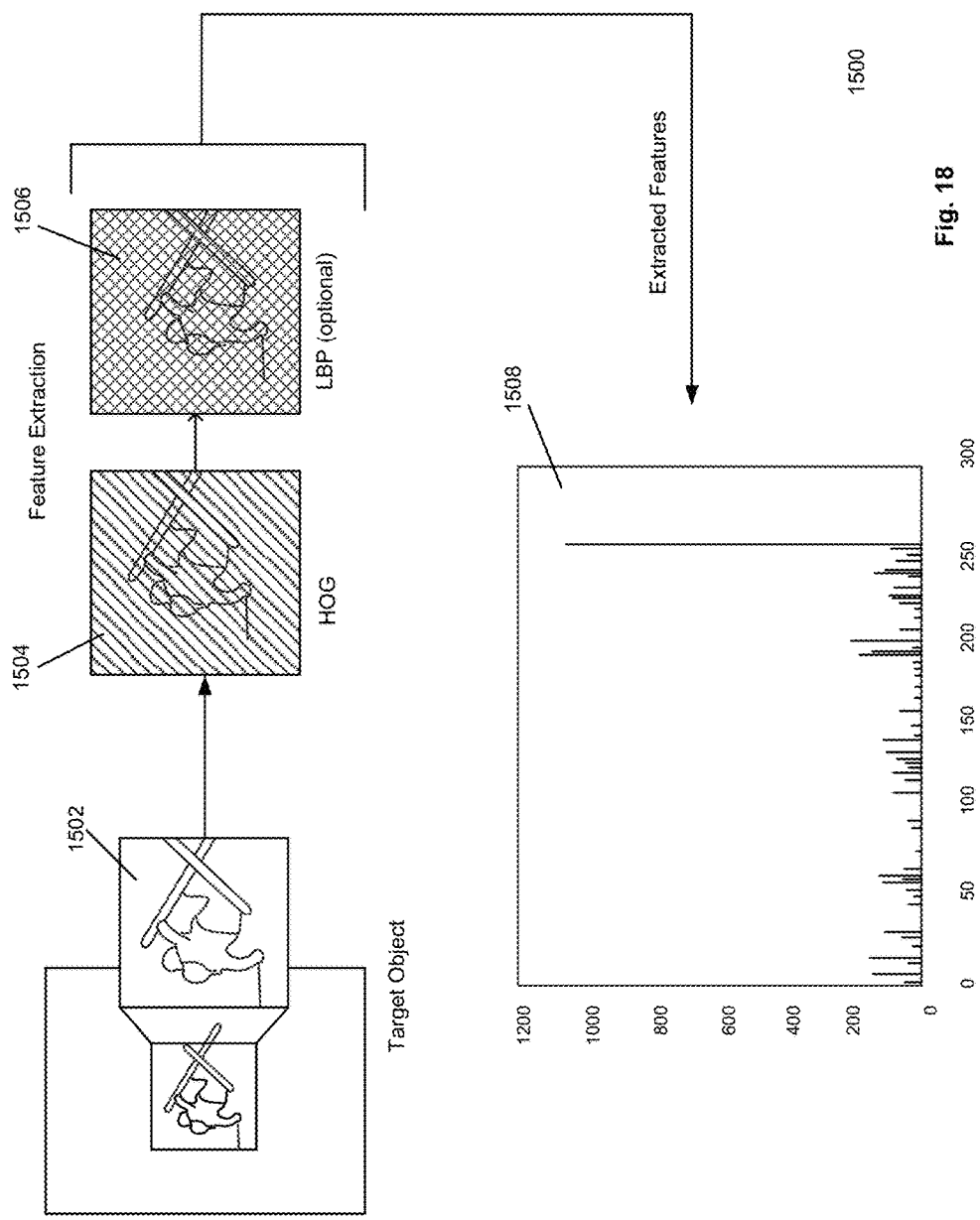

VISION BASED REAL-TIME OBJECT TRACKING SYSTEM FOR ROBOTIC GIMBAL CONTROL

CROSS REFERENCE TO RELATED APPLICATIONS

The present application claims priority from U.S. Provisional Patent Application No. 62/092,097 filed on Dec. 15, 2014, titled "PIVOTING DEVICE CONTROL," under 35 U.S.C. 119(e). The contents of the above mentioned provisional patent application is incorporated herein by reference for all purposes to the extent that such subject matter is not inconsistent herewith.

FIELD OF THE INVENTION

Embodiments of the present invention relates generally to automatic tracking of object(s) using a camera. More particularly, embodiments of the invention relates to tracking objects by automatically controlling the movements of a pivoting device on to which a camera is mounted while the camera and/or the object being tracked are physically moving within a three dimensional space.

BACKGROUND OF THE INVENTION

Photography and videography requires a cameraperson to capture a shot of the subject target. However, in dynamic environments, conditions, and activities (e.g., extreme sports, capturing shots of wild or rouge animals, aerial law enforcement chasing an alleged law violator, journalists capturing a news worthy event, etc.), following and capturing a shot of the subject target can be difficult. Furthermore, in such cases, the cameraperson is expected to follow the subject target without losing focus of the subject target, while at the same time they are attempting to capture every movement from a number of different angles. Furthermore, such camerapersons need a level of expertise and can usually only be afforded by professionals.

While with the development of handheld/portable computing devices, it may have become possible to track and capture images of a subject target with a mounted camera using tracking mechanisms like geographical positioning systems (GPS), such a system has many drawbacks. Such a system requires the subject target to carry or be fitted with the handheld/portable computing device, and also further requires that the handheld computing device be able to transmit its location to another computing system. Furthermore, such a system is dependent on the GPS unit's limited ability to transmit its location in a two dimensional space, that is clear from major obstructions (e.g., tall buildings) which may cause GPS multipath errors. Therefore, what is desired is systems, methods, and devices, that can track and capture images of a subject target with a mounted camera while overcoming the limitations of a conventional GPS enabled tracking system.

SUMMARY OF THE DESCRIPTION

The innovative subject matter described herein discloses methods, systems, and devices that are able to control a pivoting device (e.g., gimbal) operating with varying degrees of freedom. Such methods, systems, and devices can be used to track a subject target within a three dimensional space to capture desired movements or angles of the subject target. Such methods, systems, and devices can track a subject target within a three dimensional space with better accuracy and reliability.

For a gimbal, mounted on the head or upper body, to successfully track a subject's motion, real-time requirements have to be met to ensure that the display and initializing procedure is responsive to user request before subject changes its coordinates, a robust vision algorithm updates the subjects coordinates every 20-50 ms, and a real-time control interface to control the gimbal, ensuring its responsiveness to the environment.

In one embodiment, a system described herein comprises a wired display or transceiver based display camera, smartphone, or any device with an integrated camera, a pivoting device (e.g., a gimbal that can at least rotate about one or more axis) to which the camera can be mounted, a main computing system, a gimbal stabilizer controller and a human machine interface. In one embodiment, a computer vision camera is present instead of a user's camera. In yet another embodiment, a computer vision camera is present along with a user's camera. The computer vision camera can be integrated with the device carrying the user camera. In another embodiment, the computer vision camera is integrated with the pivoting device. In the various embodiment described herein, the user can mount the camera on to the pivoting device that is mounted on an object such as a helmet, car, or an aerial vehicle (helicopter, plane, unmanned aerial vehicle (UAV), or any device capable of moving and transporting an object, etc.

In one embodiment, the main computing system and gimbal stabilizer controller, together, are at least included in the pivoting device control system, described herein. The system is capable of controlling the movements of the pivoting device, thereby controlling the movement of the user's camera that is mounted on the pivoting device (adjustments made to the pivoting device can adjust the direction and angle(s) of the user's camera). The main computing system and gimbal stabilizer of such a system can be integrated together as a single computing device or can be in separate devices. In one embodiment, once the system initializes, a user can select a subject target (also referred to as a target object herein) using a machine interface (e.g., a computer input output peripheral such as a tablet, mouse, pointer device, keyboard, etc.); the user can select a subject target, i.e., an object to track, such as a snowboarder, another car, etc., to begin tracking the object or person. The user can select fixed shaped objects (e.g., car) or non-rigid objects (e.g., human, animal, etc.). Once the system is initialized the user can then start recording or capturing photographic images of the subject target. As the subject target moves (and the user begins following the subject target) the system can automatically adjust the position (e.g., orientation) of the camera using the pivoting device (e.g., gimbal, in one embodiment). Also, any unwanted movements of the pivoting device or gimbal (e.g., tilt, pan, and roll movements) can be stabilized by the system thereby resulting in a clear and focused shot of the subject.

In one embodiment, the user can provide parameters using the machine interface which can govern the "mode" or "profile" using which the system can control the pivoting device. The profile or mode settings can include a sensitively or accuracy factor that controls how aggressive (or lenient) the system will attempt to keep the subject target towards the center of the user's camera frame (thus, controlling the movement of the gimbal accordingly). A mode or profile can also include a gimbal stabilization configuration. Such a configuration can be used by the system to stabilize the gimbal during tracking of a desired object/target.

In one embodiment, the object target can be selected by the user by pointing the camera at the object and/or selecting the object using a computer input peripheral (e.g., machine interface described herein). In one embodiment, the user can control the slew rate and/or dead band parameters which gives the ability to shoot rapid moving action shots (e.g., extreme sports), or slow moving and/or relaxed shots (e.g., walking or jogging in a park). In one embodiment, such parameters can be adjusted or set using profiles or modes.

In one embodiment, the user sets the size of the Region of Interest (ROI) by drawing a square from one diagonal to the other using an Input-Output bound (IO-bound) interface such as a USB-mouse or a touch-display. The user can then click or tap the center of the object to align the square perfectly in the middle. Assuming successful tracking takes place the difference between the subject location and center of frame is treated as an error signal to generate control signals, such as Pulse Width Modulation (PWM) or Pulse Position Modulation (PPM) based signals, which are fed into the gimbal for correction. The user can also control gimbal orientation manually by tapping up, down, right, left arrows.

As mentioned above, in one embodiment, the system controls the gimbal using a separate computer vision camera that may or may not be integrated with the user's camera. In this embodiment, using the computer vision camera, the system is able to control the gimbal based on signals transmitted by the computer vision camera to the main computing system. The computer vision camera is aligned with the user's camera, so any adjustments made to the pivoting device or gimbal, based on the computer vision camera, affects the user's camera in a similar fashion.

In one embodiment, the system can use object detection vision algorithms that use unique markers, tags, or beacons such as a modulate or non-modulated infrared beacon, unique objects combined with colors, Real Time Kinematic (RTK) GPS beacons, etc., or a combination thereof. In another embodiment, rigid or non-rigid objects are detected using the contours of the subject target. In one embodiment, rigid or non-rigid objects can be detected using known object detection algorithms and/or methods (e.g., Histogram of Oriented Gradients (HOG), Local Binary Pattern (LBP), etc.). It should be noted that the above stated object detection algorithms and/or methods should be read in a non-limiting manner; any object detection method and/or algorithm known to a person of ordinary skill in the art may be used.

In one embodiment, a modified HOG algorithm to perform feature extracting. The feature extracting process of the HOG algorithm, as described herein, in one embodiment comprises a one-Dimensional image filter (e.g., [−1 0 1]) that can be applied both horizontally and vertically to compute the gradients of the image in the red, green, and blue channels. For each pixel the dominant gradient intensities out of the three channels is preserved in memory (at a memory location) while the other two channels are disregarded. The preserved gradient intensities can then be placed, depending on their direction, into a set of several (n), histogram bins, or channels, spaced out evenly between 0 and 360 degrees, resulting in a vector of n elements, where each element is an image. The pixels are then grouped into overlapping blocks and are normalized with respect to different blocks; the pixels contribute more than once to the final descriptor. The inventors have noted, with due experimentation, that because the gradient intensities can vary over a wide range owing to local variations in illumination and foreground-background contrast, effective local contrast normalization can be performed optimized performance. Finally a HOG is generated and collected over a detection window.

Thus, in embodiments capable of detecting rigid or non-rigid objects, the use of markers, tags, or beacons can be optional to provide redundancy and/or greater accuracy. The vision based algorithms used in any such embodiment can be based on tracking an object by detection with increased adaptability by comparing the current frame to the prior frame(s). In one embodiment, the system can learn general features from the object (e.g., an outline of the object, the location of different colors on the object, etc., or a combination thereof). The system can also adapt through the use of machine learning by analyzing most recent frames with the previous frames in order to adapt to the changes in a non-rigid object. Thus, the system can maintain detection and tracking of the object even if the object moves or changes shape. In another embodiment, statistical analysis through the use of estimators (e.g., Kalman filters), can be implemented to predict object trajectories in order to avoid breaks or jerky movements in the tracking of the subject target, or when the object being tracked (interchangeably referred to as the subject target or object target through out the disclosure, herein) is out of view (e.g., behind a tree, structure, etc.).

Camera stabilization functions can be provided to control rotation of the pivoting device about the X-axis (Roll), Y-axis (Pitch or Tilt), Z-axis (Yaw or Pan), or a combination thereof. In one embodiment, such rotations can be actuated by one or more electric motors, such as brushless motors. In another embodiment, the instructions required for such rotations can be actuated on the pivoting device by a proportional-integral-derivative (PID) controller or loop with a 6-Degree of Freedom (DoF) inertial measurement unit (IMU). In one embodiment, the 6-DoF IMU is provided using a 3 axis gyroscope and a 3-axis accelerometer. In one embodiment, the 6-DoF IMU serves as a feedback sensor of the Gimbal stabilizer controller. In another embodiment, the system can operate with any number of degrees of freedom (e.g., without limitation, 3-DoF through 12-DoF or more). Furthermore, a person of ordinary skill in the art would appreciate that any device capable of measuring inertial movement can be used as an IMU in any embodiment.

BRIEF DESCRIPTION OF THE DRAWINGS

The present invention is illustrated by way of non-limiting examples in the figures of the accompanying drawings in which like references indicate similar elements.

FIG. 18 describes a diagram, according to an embodiment, illustrating feature extraction of a target object.

DETAILED DESCRIPTION

Figure 1:
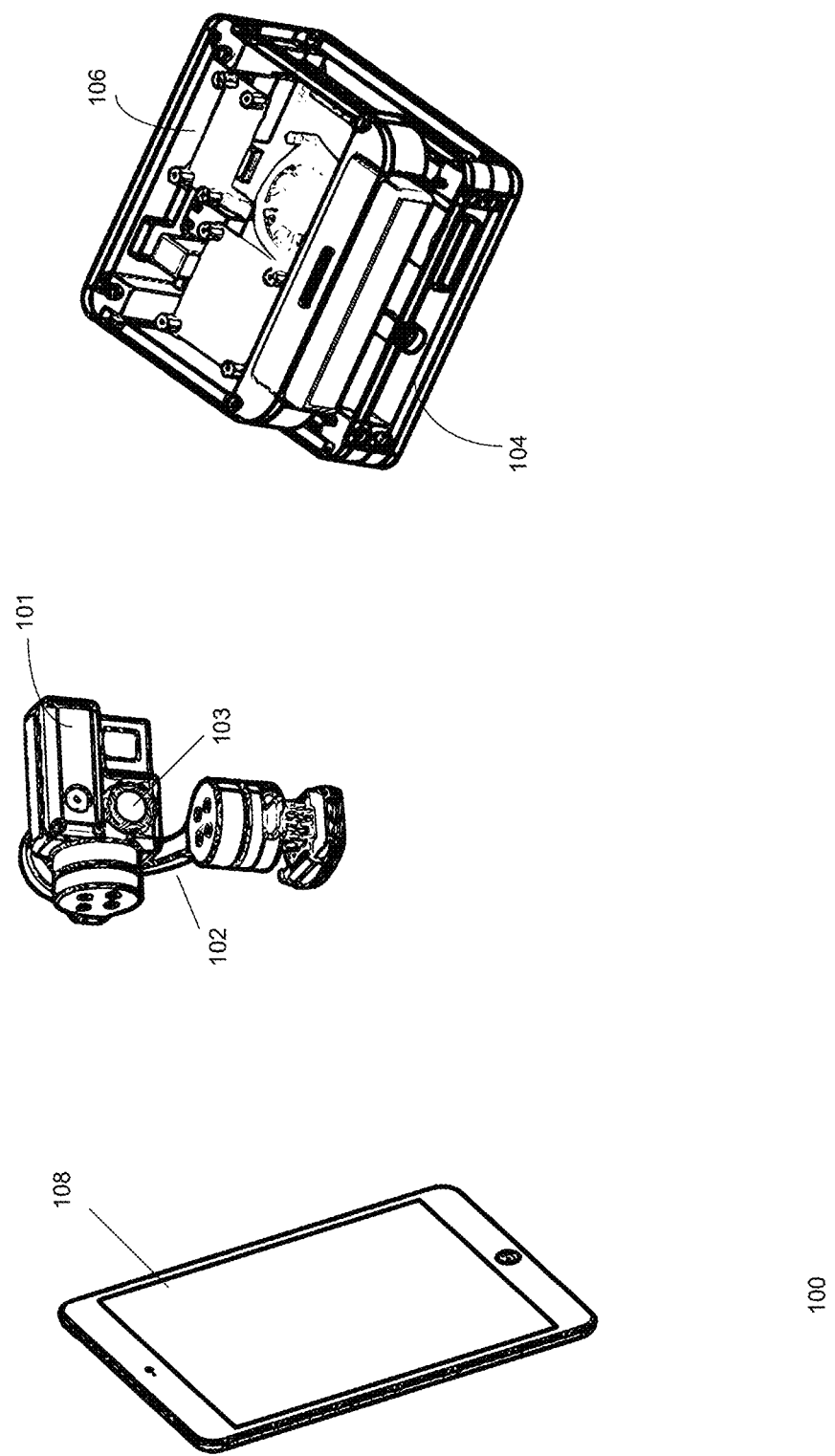
FIG. 1 illustrates a diagram, according to an embodiment, of a pivoting device control system.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" or "another embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g., circuitry, dedicated logic, etc.), software, or a combination of both. Although the processes are described below in terms of some sequential operations, it should be appreciated that some of the operations described can be performed in a different order. Moreover, some operations can be performed in parallel rather than sequentially.

The invention described herein relates to a computer aided pivoting device (e.g., a mechanical gimbal) control systems, methods, and devices that can operate with varying degrees of freedom. In one embodiment, such a system can mount a camera (consumer grade camera, professional camera, etc.) that can be used by both professionals and amateurs to control the pivoting device, while the subject target and/or the user (or object) bearing the camera and pivoting device are moving. In at least one embodiment, the invention described herein intends to eliminate, or at least reduce the dependency on a cameraperson, to capture movements of a subject target especially in, but not limited to, dynamic environments, conditions, and activities as described herein (e.g., extreme sports, capturing shots of wild or rouge animals, aerial law enforcement and/or journalists chasing an alleged law violator, etc.). In at least one embodiment, such systems, methods, or apparatuses can be used with any camera (e.g., consumer grade camera, professional grade camera, webcam, smartphone camera, etc.) to physically track a designated object using mechanical actuators and vision based control/tracking algorithms while the subject target and or the base where the camera is mounted is moving. In other embodiments, such systems, methods, and apparatuses, can allow users to obtain footage of the subject target while freeing up the user to enjoy the activity or subject target being captured.

In one embodiment, an object tracking application to track a subject of interest comprises a single 'main' process which creates the necessary processes that run concurrently together to allow the system to function as a single unit. Such concurrent processes can be generated by employing threading techniques, as known to a person of ordinary skill in the art. In one embodiment, the two processes described herein are a vision tracking process and a infrared beacon tracking process. In another embodiment, only one process (out of the two described processes) can be used. In yet another embodiment, the infrared beacon tracking process can be used as a fail-safe or secondary process where the beacon tracking process takes over in case of the vision failure or upon user request. Thus, in case of vision tracking failure, the beacon tracking can temporarily take control and track the user, until the vision tracking process is available again to recapture the subject. In the case where the vision tracking never succeeds, the beacon tracking process can control the system indefinitely until the user re-selects an object or until it fails and the system brings the gimbal facing directly ahead of the user for a reselection of the subject. A user grade camera can be employed to provide input to the vision tracking process, and an infrared camera can be used to provide input to the infrared beacon tracking process.

FIG. 1 illustrates an embodiment of the devices used in systems, methods, apparatuses of a gimbal control system as described herein. In one embodiment, system 100 comprises a mechanical gimbal 102 as the pivoting device onto which user-grade camera 101 can be mounted. A gimbal, as known to one of ordinary skill in the art, is a pivoted support system that allows the rotation of an object about an axis. As shown in the embodiment, mechanical gimbal 102 uses a set of three gimbals, to provide rotation on orthogonal pivot axis, and can be used to allow an object mounted on mechanical gimbal 102 to rotate with three degrees of freedom, as described below herein. In one embodiment, mechanical gimbal 102 comprises a set of one or two gimbals and can thus provide rotation about a single axis (x, y, or z axis), or a combination thereof. In another embodiment, mechanical gimbal 102 can be any pivoting device that can rotate with varying degrees of freedom (e.g., 1-DoF through 3-DoF, or more).

In one embodiment, mechanical gimbal 102 can be controlled using a gimbal stabilizer controller 104 that can move mechanical gimbal 102 with three degrees of freedom (3-DoF) namely, pitch, roll, and yaw, and thereby move mounted camera 101. The 3-DoF corresponding to the motions, roll, pitch (or tilt), and yaw (or pan) are aviation terms. These terms describe the orientation of a rigid body and are also known as the Euler angles. Roll describes the rotation about the X-axis, pitch describes the rotation about the Y-axis, and yaw describes the rotation about the Z-axis. The degrees of freedom exhibited by a mechanical gimbal 102 used in an embodiment of the gimbal control system is described in detail later herein.

In one embodiment, instead of camera 101, a computer vision camera 103 is present in the system. In another embodiment, computer vision camera 103 is present along with camera 101. In yet another embodiment, computer vision camera 103 can be: (i) integrated within user camera 101, (ii) can be integrated with mechanical gimbal 102, or (iii) can be a separate device. As illustrated herein computer vision camera can be any camera using which a computing device can track an object. Thus, in one embodiment, computer vision camera can be any of an infrared camera, a regular user-grade camera, or a combination thereof.

Gimbal stabilizer controller 104 interacts with computing system 106. Main computing system 106 is connected to, and can be configured by, a user using a machine interface 108. Machine interface 108 can be any computer input peripheral known to a person of ordinary skill in the art (e.g., keyboard, mouse, touch pad, pointing system, etc.). In one embodiment, using machine interface 108 a user can select or configure the system to track a target subject. In another embodiment, machine interface 108 can also be used to configure at least one parameter setting that controls a mode or profile (e.g. slew rate, dead band parameters, etc.) using which gimbal stabilizer controller 104 controls mechanical gimbal 102. Modes can further be preconfigured or can be configured by a user using machine interface 108. In one embodiment, a mode determines the sensitivity of the movement of mechanical gimbal 102. In another embodiment, main computing system 106 and gimbal stabilizer controller 104 are separate data processing units or computers. In another embodiment, main computing system 106 and gimbal stabilizer controller 104 are combined into a single computing unit. In another embodiment, once a user configures the system using machine interface 108, the configuration is stored at computing system 106. Main computing system 106 can instruct the gimbal stabilizer controller 104 to track the subject target using the user specific and/or preconfigured configuration.

Figure 2:
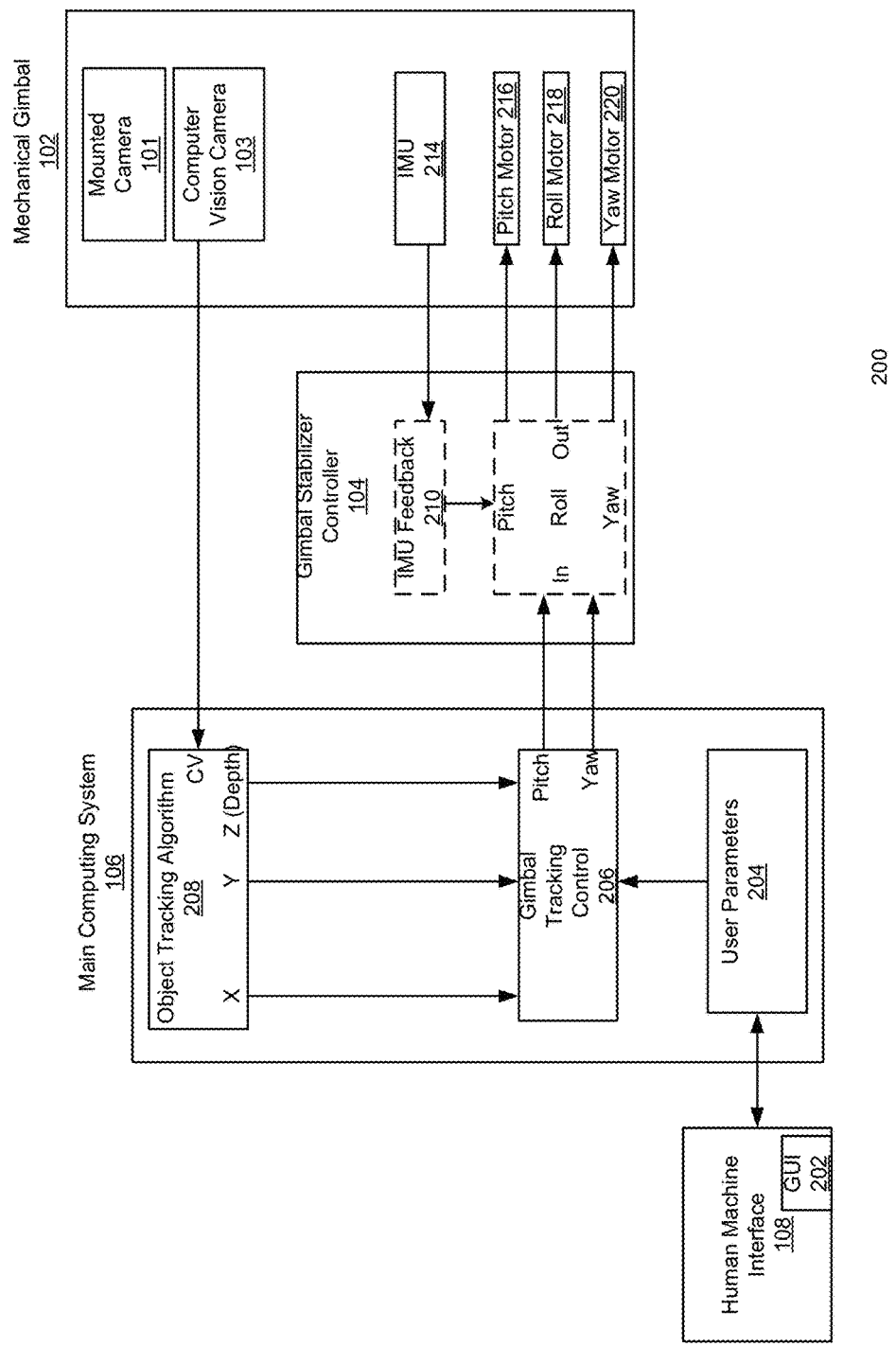
FIG. 2 describes a block diagram, according to an embodiment, illustrating a pivoting device control system.

FIG. 2 illustrates a block diagram of system 200A representing an embodiment of the pivoting device control system described herein. In one embodiment, machine interface 108 interacts with main computing system 106 via a graphical user interface (GUI) 202. As described above, machine interface 108 can be any computing input peripheral. As shown in diagram 200, machine interface 108 interacts with main computing system 106 via GUI 202. In another embodiment, GUI 202 can be an integral part of computing system 106. In one embodiment, a user can, via GUI 202, configure user parameters 204 used by computing system 106. User parameters 204 can be used by main computing system 106 to instruct the gimbal stabilizer controller 104 on how to track the target subject. In one embodiment user parameters 204 are configured and stored to generate a tracking profile or mode. In another embodiment, a tracking profile or mode is pre-generated or predefined. In yet another embodiment, user parameters 204 are configured and stored at machine interface 108, and transmitted to main computing system 106 upon user action. Such an action can be defined such that main computing system 106 only receives the user parameters when the user wishes to do so. In one embodiment, any pivoting device that provides at least 1-DoF can be used instead of mechanical gimbal 102.

In another embodiment, a user's existing gimbal can be used instead of mechanical gimbal 102. In yet another embodiment, the user can also provide their own gimbal stabilizer controller 104. In such embodiments, where a user can supply their own equipment, additional user parameters 204 that account towards the calibration of the user supplied equipment (e.g., dimensions, weight, model, etc., of the user equipment) can be supplied by the user to main computing system 106. Using such parameters main computing system 106 can configure the pivoting control system accordingly such that proper displacement (e.g., pitch, yaw) instructions can be transmitted to gimbal stabilizer controller 104.

In yet another embodiment, the pivoting device is a small, light, and optionally wearable, mechanically stabilized gimbal that is controlled by a computing device using vision based tracking and detection algorithms that are capable of detecting dynamic non-rigid objects for use with either professional or consumer cameras.

In one embodiment, the user parameters 204 are responsible for structuring and storing data on how the user wishes the pivoting device control system 200 to behave. System 200 can have a variety of different modes that the user can program such as, but not limited to, an aggressive mode, a non aggressive mode, and several others with varying degree of sensitivity of tracking the subject target. In one embodiment, these modes dictate the behavior of mechanical gimbal 102 and how rapidly it moves and tracks the object. For example, the aggressive mode would be selected if the object which the user desires to track is rapid moving and very quick (e.g., during extreme sports, law enforcement chasing an alleged violator, etc.), this will require mechanical gimbal to move rapidly to track the movement of the target object. In one embodiment, the smallest deviation can cause mechanical gimbal 102 to move in order to track the target object. However, if the object is slower moving (e.g., subject target walking or jogging, etc.) then a non aggressive mode can be selected which would cause mechanical gimbal to behave in a slower and more calm manner.

In one embodiment, the gimbal stabilizing controller 104 can have two inputs: one provided from main computing device 106 and the other from mechanical gimbal 102. In one embodiment, gimbal stabilizing controller 104 has three outputs which are used to control mechanical gimbal 102. In one embodiment, the inputs to gimbal stabilizing controller 104 can be the Pitch and Yaw Reference points from main computing device 106, and IMU measurements from mechanical gimbal 102, and the output of gimbal stabilizing controller 104 are the Roll, Pitch, and Yaw motor control signals. Gimbal stabilizing controller 104, in one embodiment, comprises a microcontroller and brushless motor drivers. In such an embodiment, gimbal stabilizing controller 104 provides the necessary signals to actuate the motors on mechanical gimbal 102 so that a mounted camera on mechanical gimbal 102 can be controlled based on the instructions provided by main computing device 106. In one embodiment, proportional-integral-derivative (PID) loops as described herein are executed on the microcontroller of gimbal stabilizing controller 104. Using the PID loops roll motor 218, pitch motor 216, and yaw motor 220 of mechanical gimbal 102 can be controlled in smooth and desirable manner.

Using user parameters 204, main computing system 106 can instruct gimbal tracking control module 206 to set a particular mode or profile, using which the subject target would be tracked. Gimbal tracking control module 206 interacts with the object tracking algorithms 208. Gimbal control module 206, using object tracking algorithms 208 and user parameters 204, controls the movement of mechanical gimbal 102 using gimbal stabilizer controller 104. Gimbal stabilizer controller 104 controls the physical movement of mechanical gimbal 102 based on the instructions it receives from gimbal tracking control 206.

Mechanical gimbal 102, in one embodiment, is a camera gimbal system comprising electric motors to actuate linkages to balance and stabilize mechanical gimbal 102 depending on the instructions received by main computing device 106. In one embodiment, such linkages are adjustable allowing to re-balance mechanical gimbal 102 depending on its end effector weight and center of mass. The last link, or end effector, of mechanical gimbal 102 can include a camera that main computing device 106 can use as its vision camera to capture images of the subject target. The motors on each linkage can actuate the orientation and/or the translation of the camera to the extent of the range of motion each degree is limited to mechanically.

In an embodiment, mechanical gimbal 102 supports 3-DoF, and provides the ability to control the orientation of a camera mounted on the gimbal in three dimensional space. This allows to point camera 101 mounted on mechanical gimbal 102 in virtually any direction with virtually any orientation. In one embodiment, mechanical gimbal 102 can have computer vision camera 103 to transmit signals related to the position of the object to main computing system 106. Mechanical gimbal 102 can include at least one IMU 214 (e.g., gyroscope, accelerometer, etc.) IMU 214 can provide feedback to gimbal stabilizer controller 104 using IMU feedback 210. IMU feedback can be provided when the base or mount of mechanical gimbal physically moves (e.g., due to user movement). Using IMU feedback 210, gimbal stabilizer controller 104 can control pitch motor 216, roll motor 218, yaw motor 220, or a combination thereof using pitch, roll, and yaw signals as referred to with numerical reference 212. Gimbal Stabilizer Controller 104 uses IMU 214 data for leveling and stabilization via IMU feedback 210.

Gimbal tracking control module 206 can also transmit signals to gimbal stabilizer controller to control the roll, pitch, or yaw motors of mechanical gimbal 102 based on the signals received by computer vision camera 103, when applied to object tracking algorithms 208, as disclosed above.

In one embodiment, gimbal tracking control 206 is responsible for how smoothly or quickly mechanical gimbal 102 physically tracks the object based on the object tracking algorithm 208 coordinates and user parameters 204. The different modes the system enters into results in how gimbal tracking control 206 will instruct mechanical gimbal 102 to move. The gimbal tracking control 206 can also be set to behave more aggressively if the object is closer to the system since the object can more easily over come the boundaries of the frame of the vision camera when it is closer. Likewise, if the object is farther away gimbal tracking control 206 can automatically decrease its aggressiveness proportionally since the object cannot over step the bounds of the vision camera as easily when it is farther away. In order for gimbal tracking control 206 to center the object it is tracking into the center of the vision camera frame it can use another layer of proportional-integral-derivative (PID) loops to ensure smooth response and physical tracking. For each PID loop the PID values are determined by the current mode that gimbal tracking control 206 is in and the depth of the object being tracked.

While tracking a subject on the screen of interface 108, each pixel on the screen has an X Y coordinate with the center of the screen biased to 0,0. As the subject being tracked moves off the center point, control efforts are made based on the position of the target. These Control efforts are determined by a common PID loop where the 'I' and 'D' variables can be ignored for simplicity (i.e. set to zero, no effect). The PID loop compares the current position of the target on the screen to the center reference point on the screen, the difference is the error, that error is multiplied by a the proportional variable P which controls the intensity of how aggressively control efforts are made to center the target. Once a control effort is made, the same process continues now with the updated location of the target, until the target is re centered at which point the error is zero as well as any control efforts. Control efforts (made by the Gimbal Tracking control 206) maintain the reference position which is controlled by the tracking algorithm 208 control efforts, which is in turn determined based on the position of the target on screen in reference to the center of the screen 108.

Figure 3:
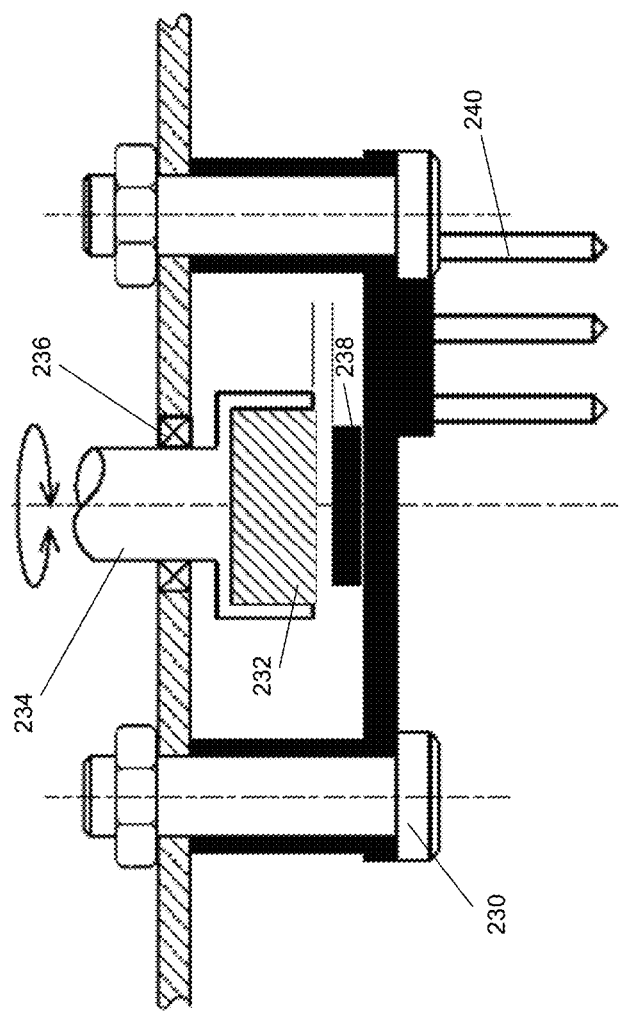
FIG. 3 illustrates diagram 200B depicting a motor used to control the angular position of the gimbal, according to one embodiment of the present invention FIG. 4 describes a diagram, according to an embodiment, illustrating different modes that can control the behavior of the pivoting device control system.

FIG. 3 illustrates diagram 200B depicting a motor used to control the angular position of the gimbal, according to one embodiment of the present invention. In one embodiment, motor 230 can be used as pitch motor 206, roll motor 218, or yaw motor 220. In one embodiment, to control angular position of motor 230, magnetic encoders can be used. In such an embodiment, magnet 232 is fixed to rotatable motor shaft 234. When motor shaft 234 is rotated with assistance of bearing 236, a magnetic field is generated and such magnetic field can be sensed by the magnetic encoder sensor 238 that is positioned very closely (but on a different body than the shaft) so that it does not rotate along with the shaft. In one embodiment, the distance between magnet 232 and encoder 238 is between 0.5 to 2 millimeters (mm). As motor shaft 234 rotates so does magnet 232, and the magnetic field observed by sensor 238 changes proportionally. Sensor 238 outputs a voltage reading proportional to the angular position of shaft 234, using pins 240. Using such a mechanism, in one embodiment, output of sensor 238 can be used as a redundancy in the IMU feedback 210 PID loop for leveling and stabilization of the gimbal. Further, in this embodiment, the gimbal can be pivoted to any angular position relative to the base of the gimbal with great reliability and accuracy. In case of a failure (either in vision and/or beacon based tracking, depending on the embodiment), the gimbal can assume a '12 o'clock' position. Thus, the encoders also enable absolute positioning of the gimbal, in addition to relative positioning.

Figure 9A:
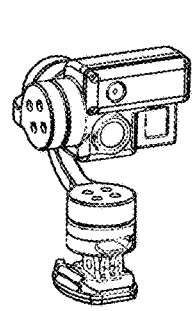
FIGS. 9A, 9B, and 9C, describe diagrams, according to an embodiment, illustrating the roll movements of a mechanical gimbal used as the pivoting device.
Figure 9B:
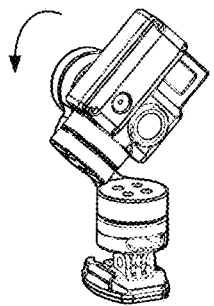
Figure 9C:
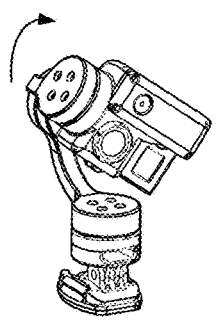
Figure 9D:
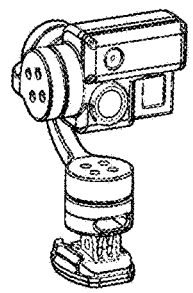
FIGS. 9D, 9E, and 9F, describe diagrams, according to an embodiment, illustrating the pitch movements of a mechanical gimbal used as the pivoting device.
Figure 9E:
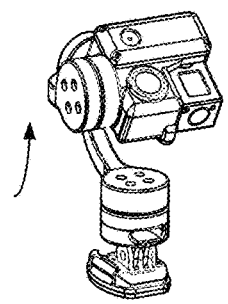
Figure 9F:
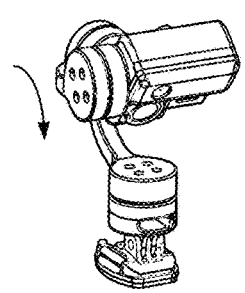
Figure 9G:
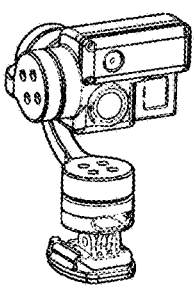
FIGS. 9G, 9H, and 9I, describe diagrams, according to an embodiment, illustrating the yaw movements of a mechanical gimbal used as the pivoting device.

In one embodiment, the configuration of all three (pitch, roll and yaw) motors is calibrated by leveling out the gimbal's end effector and positioning each motor angle 90 degrees off from the next, as further illustrated in FIGS. 9A, 9D, and 9G. This creates the initial zero reference point for each motor encoder and the IMU. The magnetic field perceived at this orientation for each motor encoder is its zero reference as well as the IMU's orientation. In one embodiment, a standard PID loop, as discussed above, is used to maintain each motor at its angular reference point. The zero reference point can be incremented or decremented to cause the motor to rotate proportionally and appropriately.

Gimbal Communication:

Generally, CPU (e.g., ARM based architecture) and/or Operating System (OS) (e.g., Linux) generated PWMs are slow at adjusting the duty cycle and its prone to the same type of non preemptive latency issues as regular General-purpose input/output GPIO devices. Thus, in order to control the gimbal in real-time, a low-cost programmable micro-controller (e.g., Arduino, atmel AVR, and TI stellaris platforms) can be employed. Additionally, offloading the PWM controls task to the micro-controller allows for all gimbal interfacing functionalities to be dedicated for the micro-controller; this saves the OS/CPU resources some being time critical such as implementing PID loops. In one embodiment, the object location value and the error signal provided to Gimbal Stabilizer Controller 104 is updated by the micro-controller periodically (e.g. every 20-50 ms). In addition, in one embodiment, the object location value and error signals can be updated at non-periodic durations as well, with an inconsistent frame rate, some being up to 10 ms variance. The micro-controller, however, works to provide consistent PWM value updates to the gimbal.

In one embodiment, gimbal controls can achieve bidirectional communication with main computing device 106 using a Serial Peripheral Interface (SPI). An advantage of using a SPI for full duplex communication has an added advantage of a dedicated clock signal, since such a clock signal is much less error prone than raw serial communication. However, in order for SPI to work the OS kernel must have the necessary modules and features enabled. Custom kernels can thus be obtained by a hardware provider or can be built if the standard kernel provided by the manufacturer doesn't have the available features. These features can be turned on by using a configuration tool (e.g., menuconfig, xconfig, gconfig) or by directly modifying the configuration file.

After configuration, a kernel can be compiled that can support SPI. The gimbal hardware can be configured using a Device Tree or Open Firmware. The Device Tree Binary (DTB) is a machine-coded file which configures the kernel during boot time. This file gets modified by using a Device Tree Compiler (DTC) to compile backwards and produce a Device Tree Source (DTS), or a human readable file, which is a data structure describing the hardware. The hardware schematic and TRM describe the physical pins used for SPI. The SPI pins are mapped into entries on the DTS. Using the entries SPI devices to the entries for application support can be added. The hardware usually consists of a memory, DMA and SPI peripheral. The controller device driver, which is board specific, configures the hardware for bi-directional communication, internal data gets pushed to the DMA from memory to the SPI peripheral and external data gets pushed from the DMA to the memory where it gets passed to the controller driver. The controller then packages the data and sends it to the peripheral driver. The peripheral driver then communicates to the rest of the system including the added SPI device entries on the DTS, which can communicate to the application via file. Once the DTS is complete the DTC works forward to produce the DTB which then gets brought up during boot time with the new SPI device support.

Figure 4:
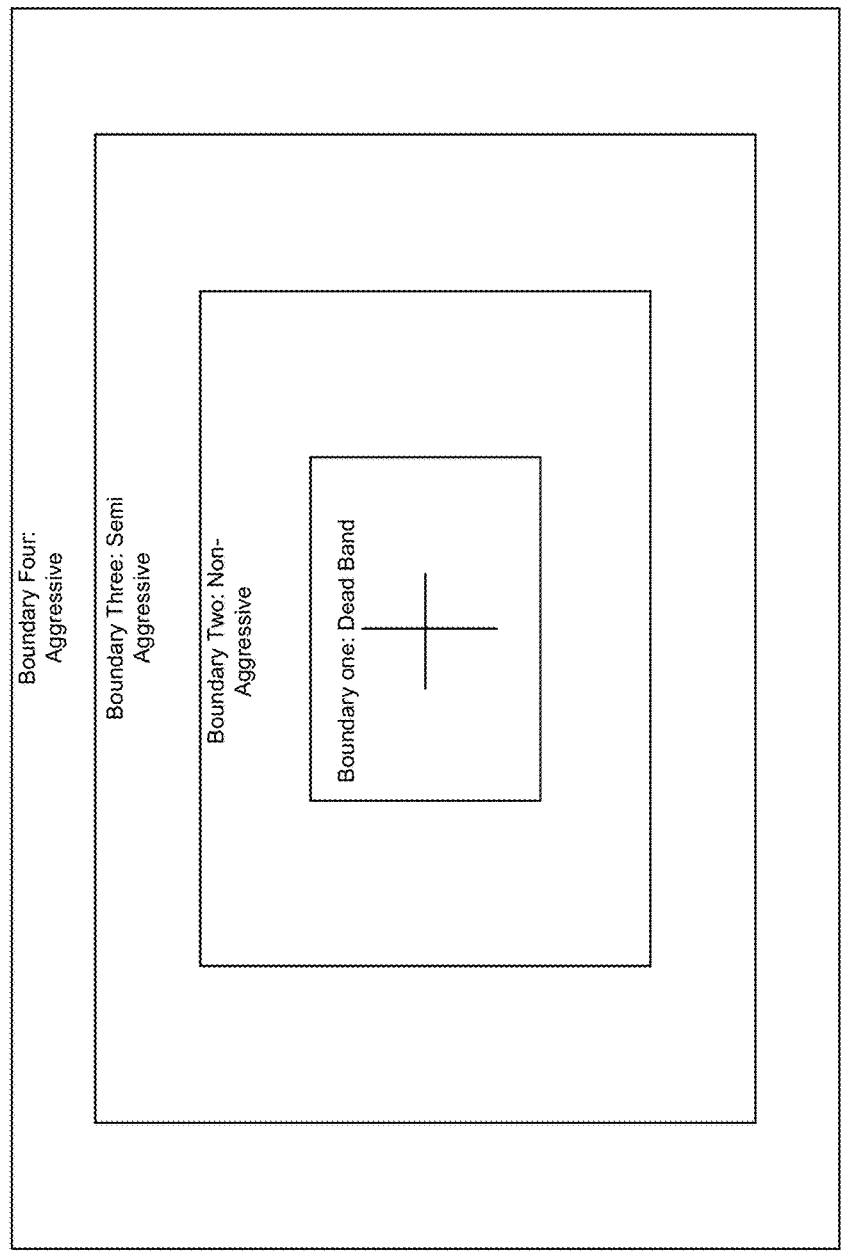

FIG. 4 illustrates a diagram 300A illustrating the modes describes herein used with boundary limitations within a camera frame. In one embodiment, parameters can be used to set one or more boundary limitations on the target object, where each mode is implemented within a boundary limitation of a frame. In one embodiment, this can enable the user of system 200 to utilize multiple modes in a single shot. Multiple boundaries can be set each assigned with a specific mode. Each boundary can be centered and fixed to the center of the frame. For example, mechanical gimbal 102 can behave in a non aggressive mode while the object is in the center of the frame and within a first boundary (closest to the center of the frame). However, once the target object crosses the threshold of the first boundary and enters the next boundary (further away from the center, past the first boundary), the mode can change to a slightly more aggressive mode, and once it enters the next boundary (and the object moves towards the boundary of the frame itself), system 200 can utilize a more aggressive mode. When setting up boundaries it is possible to also program a zero response for the first boundary, in other words a deadband that can allow the object to linger to the edge of the boundary without mechanical gimbal 102 moving, or tracking, in order to capture scenic views without much movement. If the object escapes the first boundary the instructions transmitted to mechanical gimbal can switch to another (aggressive) mode to ensure the object stays within the first boundary. In one embodiment, Once the object is within the first boundary again, the system can reduce the sensitivity with which mechanical gimbal 102 tracks the object, and the system can reduce the mode to a less aggressive tracking mode.

Machine interface can be a smartphone, tablet, or a touchscreen monitor accessory, or any computer peripheral as described herein. In one embodiment, machine interface 108 can have a strap that can firmly attach itself to the forearm of the user for quick access and hands free. Machine interface 108 can provide a live feed of the vision camera frame with a graphical user interface (GUI) overlaid over it. In one embodiment, when the system is turned on, a live feed can be displayed on the GUI. Frame retrievals occur by calling device API such as V4L2 for both vision and infrared sensors. To achieve or ensure real-time rendering of the 2D-display, the vision frame is converted into a texture image using an API purely concerned with rendering (e.g., OpenGL). The display interface such as HDMI and many more computer-common interfaces are already established with modern embedded development boards (e.g., Jetson TK1), being pre-installed with a full-fledge OS. The modules necessary for the application are kept when downscaling the OS kernel to solely meet the application needs. In another embodiment, initially there can be two options to choose from initialize and settings. If initialize is selected then the user can be asked to select an object to track. The user can then select an object either by tracing a bounding box around the object, tapping the object, or scribbling over the object. In one embodiment, once initiation is complete the GUI will go back to initial overlay but the initialize tab can be replaced with a ready tab. if the user selects setting the GUI will proceed to the settings page. On this page there will be options to edit boundaries for different modes, as described herein. The user can add or select an existing bound, change or select its size and sensitivity mode. In one embodiment, a dropdown list of all bounds will be present and each one will be selectable, once selected it can be edited.

In yet another embodiment, when a specific boundary is selected all other boundary parameters can temporarily disappear from the user interface except for the selected boundary. From there the user can be requested to select the top left or bottom right corner of the boundary and drag it to a desired size. A new dropdown tab can then be visible in the selected screen with a tab for each of the following items deadband, aggressive one, aggressive two, aggressive three, aggressive four, and aggressive five, with the selected one highlighted. The user can tap a different tabs to change the mode used by a boundary.

On the initial page if initialization has been completed then the tab will be replace with a ready tab. If selected the GUI will enter the ready overlay, as long as the object is within the frame. In one embodiment, an action tab is provided. The user can select the action tab and the system can begin tracking and recording. In one embodiment, while recording, record time and battery life can be display at the top right corner of the frame. The object can also have a virtual tag or marker on it while it is being recorded.

In another embodiment, the user can select multiple objects as the target object. In this embodiment, the system can position itself as such that at all times both objects are visible in the camera frame. In yet another embodiment, if multiple objects are initialized by the user, the user can switch between physically tracking one or the other by tapping a virtual marker or tag on the object.

Figure 5:
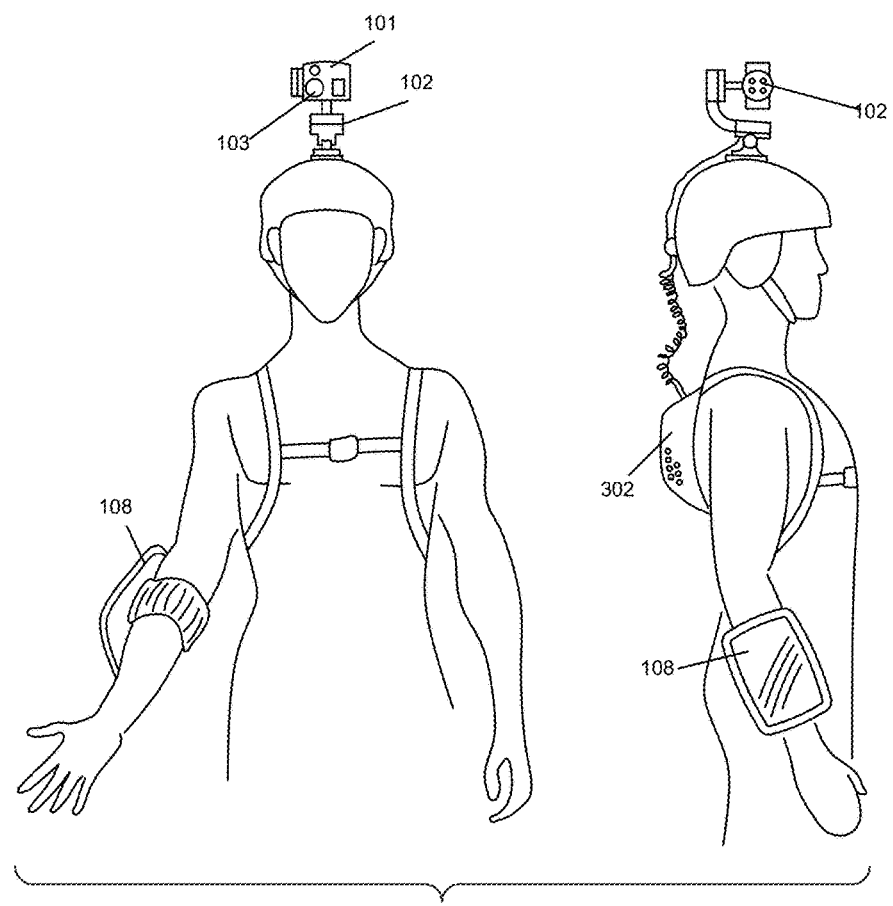
FIG. 5 illustrates a diagram, according to an embodiment, of a user on to which the pivoting device control system can be mounted.

FIG. 5 illustrates an embodiment 300B of the pivot device control system mounted on to the headgear of user or photographer. In this embodiment, mechanical gimbal 102 can be mounted on a head gear of a user or photographer on to which camera 101 can be mounted along with computer vision camera 102. The user can also wear a backpack enclosure 302 to hold other required electronic devices or gadgets necessary for the system to control the pivoting device. In one embodiment, backpack enclosure 302 holds gimbal stabilizer controller 104 and/or main computing device 106. In one embodiment, the whole system can be embedded in the gimbal head gear. Machine interface 108 can, optionally, be mounted on the user's arm from where user parameters and or other instructions can be inputted for, and transmitted to, computing system 106. While recording the tracked object, this embodiment can assist the user or cameraperson to monitor object detection. This can also help in increasing battery life and/or increase wireless controllability using a wireless network. In this embodiment, the user can also control the system (e.g., change target object, correct object position, or change position of the mechanical gimbal). In such a way, a user can monitor and track an object while the object is moving, the user is moving, or a combination thereof. In another embodiment, machine interface 108, can be separate small module or device that can be easily worn by the user, and that is authorized to control and/or observe the system. In one embodiment, such a module or device can be included into a wrist watch or any other wearable technology.

Although, mechanical gimbal 102 is mounted onto a user, a person of ordinary skill in the art would appreciate that mechanical gimbal 102 can be mounted to any system or device, instead of a user or photographer. For example, mechanical gimbal 102 can be mounted onto, but is not limited to, helicopters, drones, car, boats, robotic systems, a standalone device (e.g., device to support desktop webcams), toys, artificial intelligent machines, etc. Mechanical gimbal 102, in one embodiment, can have a quick release mechanism attached to its base. This makes it easy for the user to attach mechanical gimbal 102 to virtually anything by attaching the opposite quick release to a desired location.

In one embodiment, mechanical gimbal 102 comprises various joints for movement in at least one degree of freedom. In one embodiment, each joint comprises a brushless electric motor used to actuate the links (arms) of mechanical gimbal 102. The end effector is designed to accept a variety of different consumer cameras which the user wishes to use. In another embodiment, the end effector can comprise vision camera 103 using which main computing system 106 uses as an input to track the desired subject target (object, person, etc.).

In one embodiment, Machine Interface 108 is not mounted on to the user, but is rather controlled from a stationary location. In another embodiment, machine interface 108 interacts with computing device wirelessly using wireless technologies (Bluetooth, Wireless Local Area Network (WLAN), Infrared, Near field communication (NFC), Wireless mobile communications like 3G/4G, etc). In a preferred embodiment, WIFI direct (e.g., Miracast) is used to for interactions between machine interface 108 and computing device 106. In another embodiment, WIRED HMDI, real-time open source wireless streaming software (e.g., VLC) can be employed. In another embodiment, the pivoting device control system has a server client architecture. In such an embodiment, gimbal stabilizer controller 104 and/or computing device 108 are remotely located and comprise at least a part of the server device or service (e.g., cloud computing, Software as a Service (SaaS), etc.). Further, backpack enclosure 402 can hold a wireless communication device (client side device) that can interact with mechanical gimbal 102 and the remote server or service.

Figure 6:
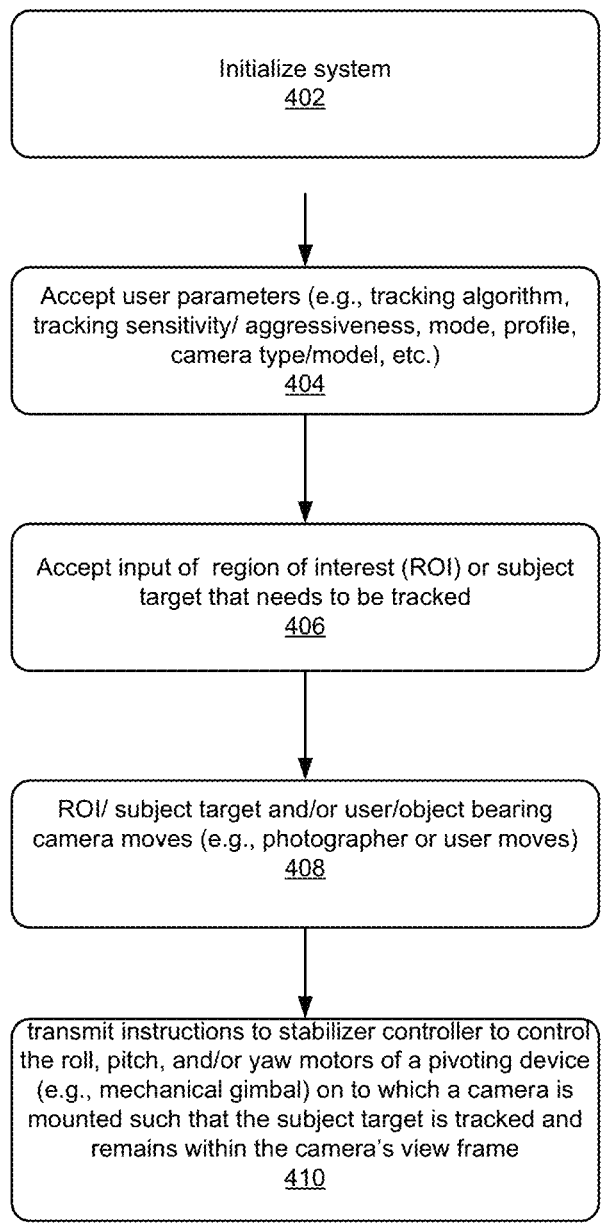
FIG. 6 describes an overview flow chart diagram, according to an embodiment, of a main computing system.

FIG. 6 illustrates flow diagram 400A of main computing system 106 as described in an embodiment herein. At block 404 main computing system accepts user parameters, and at block 406 main computing system accepts input of selecting the subject target or region of interest (ROI). At block 408, the subject target/ROI begins moving. At block 410, main computing system 106 transmits instructions to gimbal stabilizer controller 104 to control the pitch and yaw motors of mechanical gimbal 102 so that the subject target is tracked and remains within the camera's view frame. Main computing system performs the calculations required to control the pitch and yaw motors using the signals transmitted by computer vision camera 103.

Figure 7A:
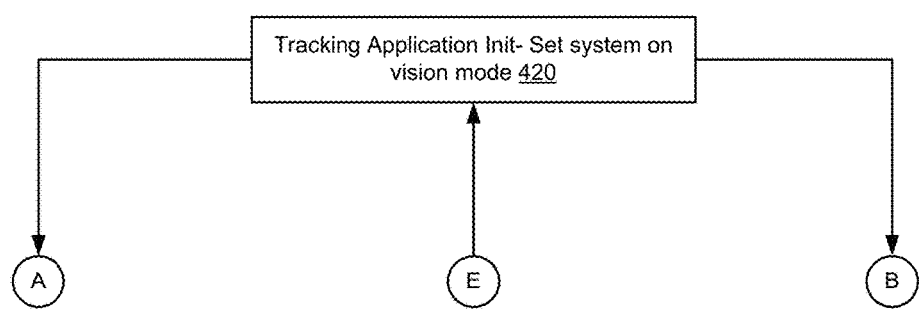
FIGS. 7A, 7B, and 7C describe a detailed flowchart diagram, according to an embodiment, of the main computing system.
Figure 7B:
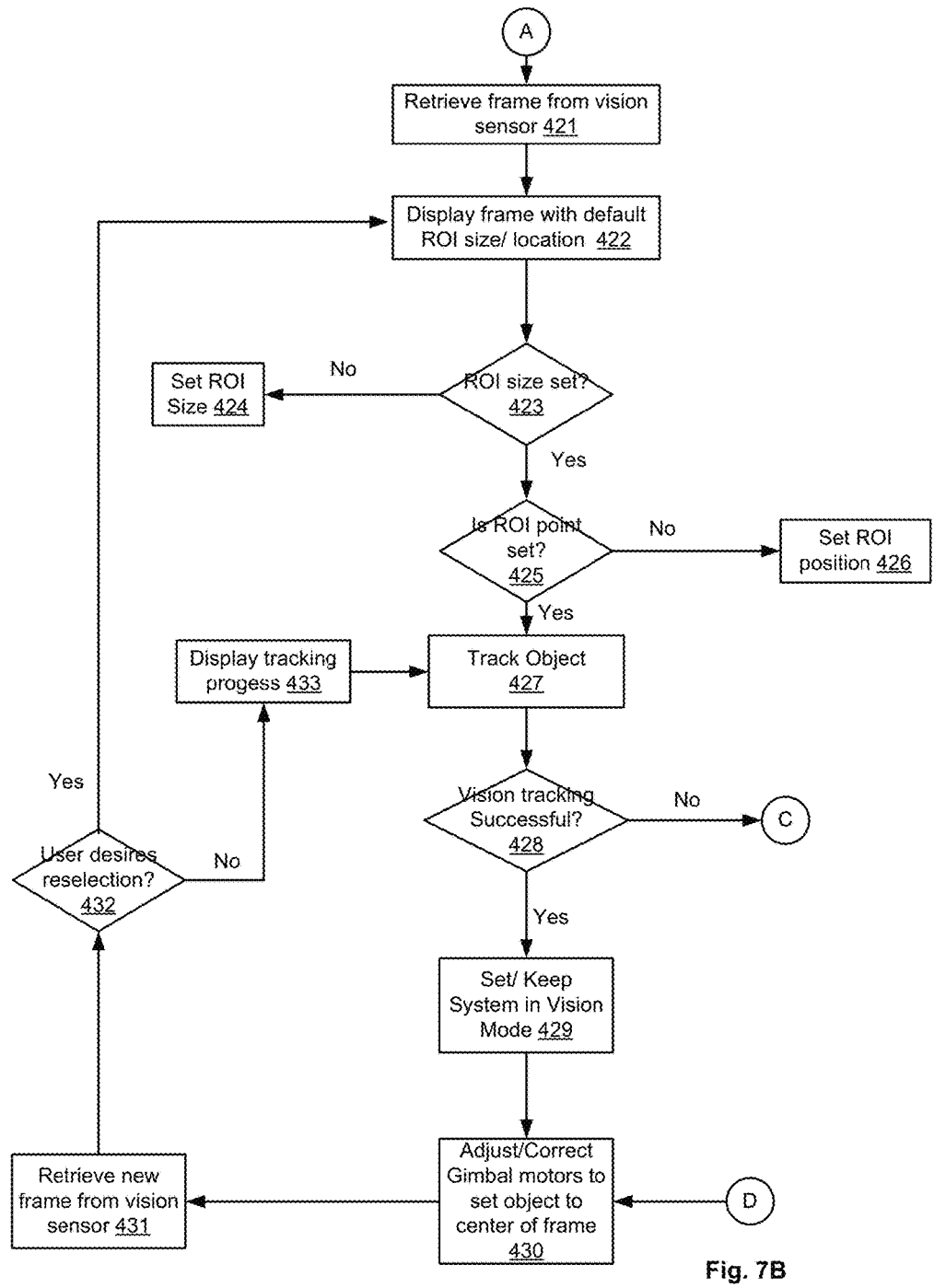
Figure 7C:
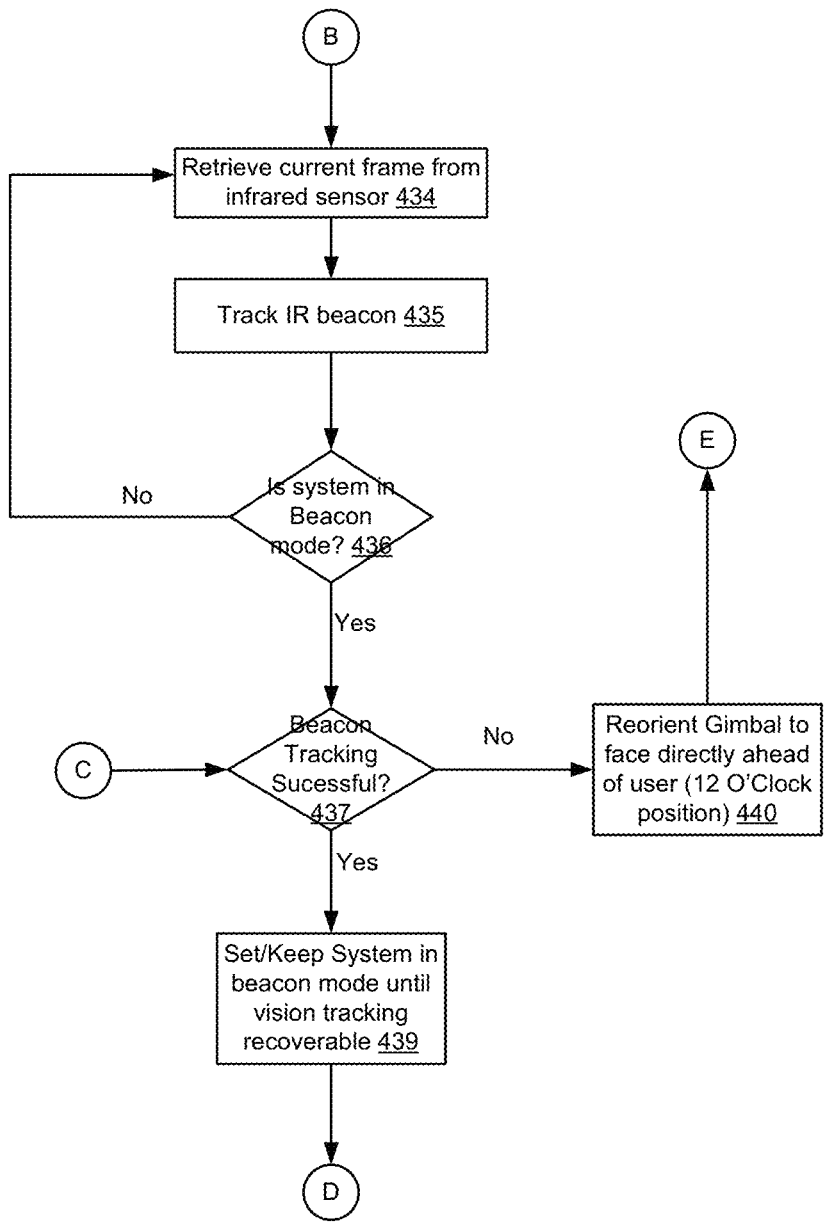

FIGS. 7A, 7B, and 7C illustrate a detailed flow chart of main computing system 106 as described in an embodiment herein. As illustrated in FIG. 7A, at 420 the system is initialized by enabling the tracking application (e.g., main process as discussed above). In one embodiment, the initialization of the system defaults to enabling the vision tracking algorithm. As discussed above, the tracking algorithm executes two processes, herein referenced to as reference marker "A" and reference marker "B." Control is returned back to 420 via reference marker "E," as further discussed herein.

Reference marker "A" illustrating the vision tracking process is discussed at FIG. 7B. At 421 the application retrieves a frame from the vision sensor (e.g., camera). At 422 the frame is displayed at interface 108 with a default ROI size and location. At 423 the system determines is the ROI size is set. If not, at 424 the system prompts the user to set the size of the ROI. Once the size of the ROI is received, the system determines if the ROI location is set at 425. If not, at 426 the ROI location/position is set. At this time the system can begin tracking the object as illustrated at 427. At 428 it is determined if the vision tracking is successful. If not, control passes to 437 as discussed further herein. If vision tracking is determined to be successful, at 429, the system remains in the vision tracking mode. At 430, the system adjusts the gimbal control motors to ensure the subject remains at the center (or close to the center) of the frame. The system then, at 431 retrieves a new from the vision sensor. At 432 the system determines if the user has opted to reselect the ROI. If so, control passes to 422 and the process continues as discussed above. However, if the user does not desire a reselection of the ROI, then the display tracking progresses as previously instructed, as illustrated at 433 and control passes to 427.

In one embodiment, redundancy or fail-safe mechanisms (as previously discussed) can be achieved by the system at 420 by concurrently executing an infrared beacon tracking process. As illustrated at FIG. 7C, reference marker "B" passes control to the infrared sensor tracking process. As illustrated, the main tracking application can also retrieve a frame from an infrared beacon sensor when the application is initialized, as illustrated at 434. At 435 the system tracks the infrared beacon. At 436 the system determines if the beacon mode is enabled. If not, the system does not activate the infrared beacon mode (until a request is received by the vision tracking algorithm (for assistance)), and control loops back to 434. Thus, while the system gathers each frame from the IR sensor, no processing is done until the beacon mode is enabled, as discussed further herein. If/when it is determined that the infrared beacon tracking mode is enabled, control passes to 437 where it is determined if the beacon tracking is functioning correctly. If beacon tracking is determined to be successful, the system keeps the beacon tracking mode enabled (439) until vision tracking is determined to be successful achieved at 428. Once the system determines that vision tracking was successful, beacon tracking is disabled at 439 as well. From 439 control passes on to 430. If however, at 437 beacon tracking is not successful, at 440 the gimbal is reoriented to face directly ahead of user (also referred to as 12 O'clock position herein). Control is then passed on to 420 where the process repeats.

In one embodiment, the system when initialized at 420, attempts to simultaneously retrieve a frame from both the infrared beacon sensor (434) and the vision sensor (421). In another embodiment, initially only the vision frame is retrieved at 421 and the infrared sensor frame 434 is retrieved only if the vision tracking is determined as unsuccessful at 428 and control passes to 440 via 437.

Figure 8:
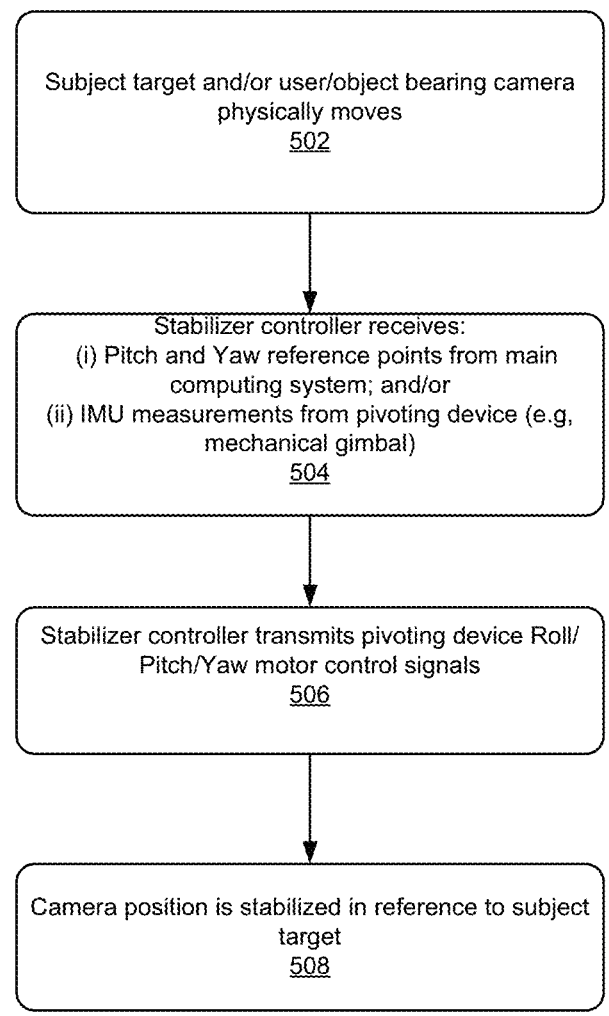
FIG. 8 describes a flow chart diagram, according to an embodiment, of a gimbal stabilizer controller.

FIG. 8 illustrates flow chart diagram 500 of gimbal stabilizer controller 104 as used in one embodiment. At block 502 the subject target and/or the user/object bearing camera 101 and gimbal 102 moves. At block 504 gimbal stabilizer controller 104 receives pitch and yaw reference points from main computing system 106. Gimbal stabilizer controller 104 can also receive IMU measurements from mechanical gimbal IMU 214 of mechanical gimbal 102. At block 506 gimbal stabilizer controller transmits Roll/Pitch/Yaw motor control signals to adjust mechanical gimbal 102 based on the signals received from main computing system 106 and/or IMU 214.

FIGS. 9A, 9C, 9C, 9D, 9E, 9F, 9G, 9H, and 9I illustrates various movements of mechanical gimbal 102 having 3-DoF in a three dimensional space of an embodiment of the pivoting device control system 100. In one embodiment of the gimbal control system, a camera is mounted on mechanical gimbal 102. In such an embodiment, roll refers to movement of mechanical gimbal 102 so that a rotation about the X-axis results in the camera to roll left or right. Pitch refers to the movement of mechanical gimbal 102 such that a rotation about the Y-axis results in the mounted camera to tilt/pitch up or down. Yaw refers to movement of mechanical gimbal 102 so that a rotation about the Z-axis results in a mounted camera to pan to the left or the right. Such movement can be achieved by angular movements of the pitch 216, roll 218, and yaw 220 motors, as discussed above. FIGS. 9A, 9D, and 9G illustrate a level/neutral position of the gimbal prior to a roll, pitch and yaw movement respectively.

Figure 9H:
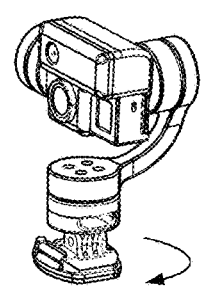
Figure 9I:
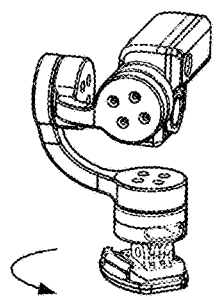
Figure 10A:
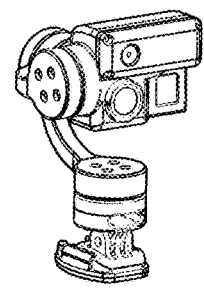
FIGS. 10A, 10B, and 10C describes diagrams, according to an embodiment, illustrating the camera stabilizing techniques that can be employed by the mechanical gimbal while the base (or mount) or the gimbal exhibits roll movements.
Figure 10B:
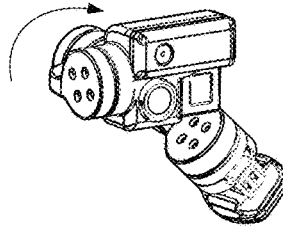
Figure 10C:
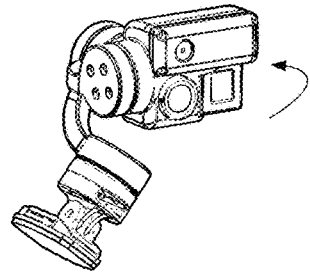
Figure 10D:
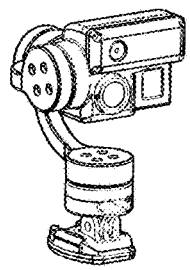
FIGS. 10D, 10E, and 10F describe diagrams, according to an embodiment, illustrating the camera stabilizing techniques that can be employed by the mechanical gimbal while the base (or mount) or the gimbal exhibits pitch movements.
Figure 10E:
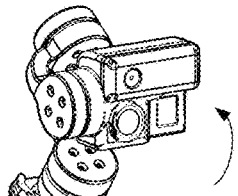
Figure 10F:
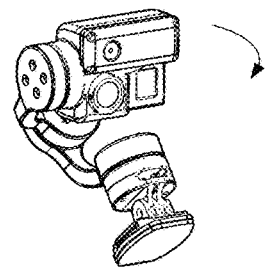
Figure 10G:
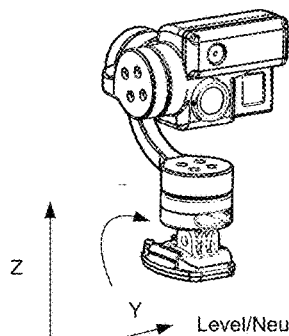
FIGS. 10G, 10H, and 10I describe diagrams, according to an embodiment, illustrating the camera stabilizing techniques that can be employed by the mechanical gimbal while the base (or mount) or the gimbal exhibits yaw movements.
Figure 10H:
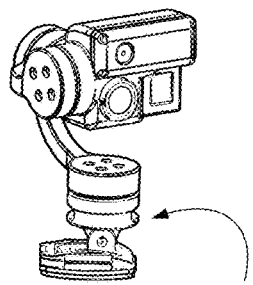
Figure 10I:
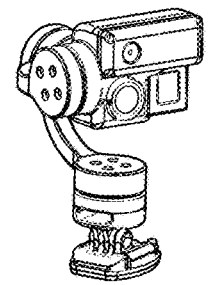

In FIGS. 9B and 9C, roll movements of the gimbal to the right and left, respectively, are illustrated. FIGS. 9E and 9F illustrate Pitch up and pitch down movements respectively. FIGS. 9H and 9I illustrate yaw right and yaw left movements respectively.

FIGS. 10A, 10B, 10C, 10D, 10E, 10F, 10G, 10H, and 10I illustrate an embodiment a mechanical gimbal where the end effector carries a 6 DoF Inertia Measurement Unit (IMU) comprised using a 3 DoF Gyroscope and a 3 DoF Accelerometer. Various movements of mechanical gimbal are illustrated. In one embodiment, the IMU provides feedback on the end effector orientation (in the case of a 3-DoF mechanical gimbal 102) to the gimbal stabilizer controller 104. Gimbal Stabilizer Controller 104 uses this data to keep mechanical gimbal 102 level or stable via a Proportional Integral Derivative (PID) loop. This ensures that a camera system mounted on mechanical gimbal 102 would always stay level and stable no matter how the orientation of the base of mechanical gimbal 102 changes.

Figure 11A:
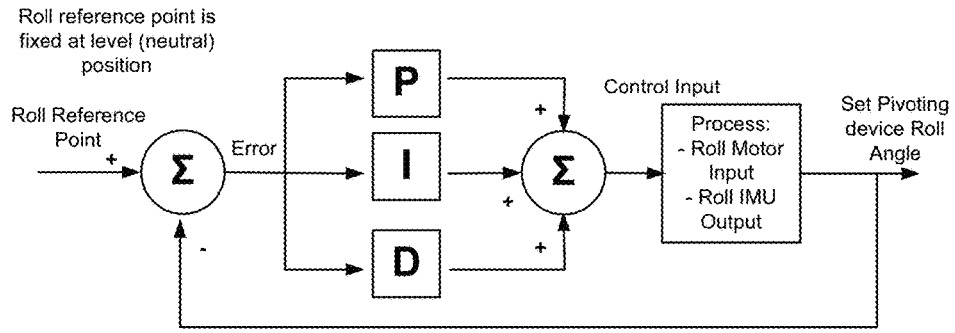
FIGS. 11A, 11B, and 11C describe diagrams, according to an embodiment, illustrating techniques using which the gimbal stabilizer adjusts the movements of the mechanical gimbal.
Figure 11B:
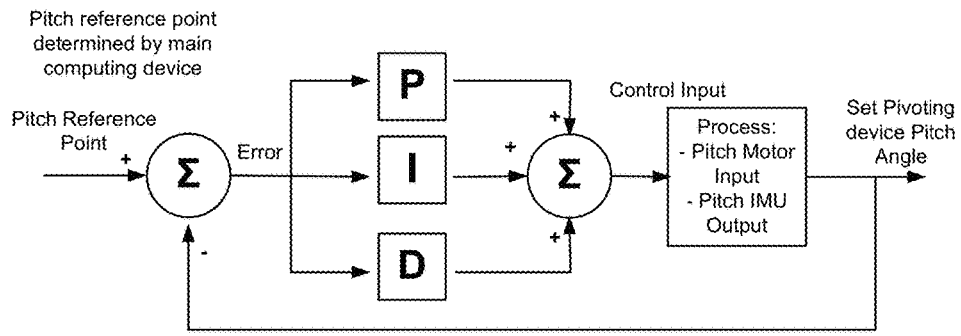
Figure 11C:
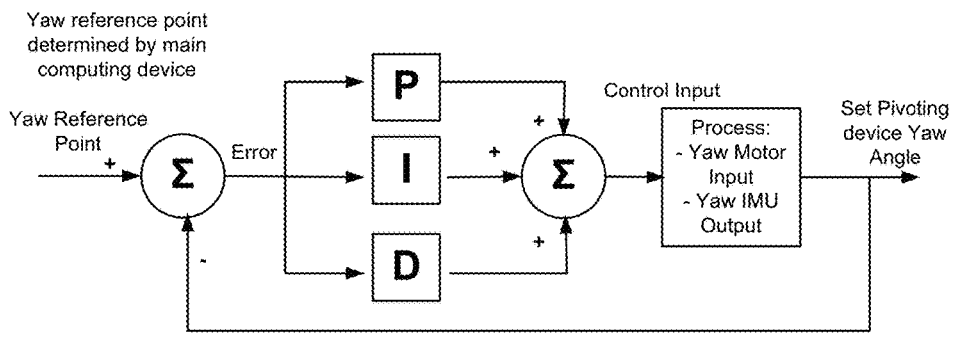

FIGS. 11A, 11B, and 11C, in another embodiment, illustrates a block diagram disclosing a separate PID loop that can be used to control and stabilize each motor for the Roll, Pitch, and Yaw movements of mechanical gimbal 102, as shown in FIGS. 11A, 11B, and 11C, respectively. In such an embodiment, the gimbal stabilizer controller 104 can stabilize mechanical gimbal 102 to a set reference point that can be computed based on the initial position of the camera. Computing device 108 can manipulate this reference point to cause the camera to point in any direction while gimbal stabilizer controller 106 stabilizes mechanical gimbal 102 about each axes' reference point. This allows the system to pan and tilt the camera in a level and stabilized fashion while the base of mechanical gimbal could be rolling, pitching, yawing, or a combination thereof.

FIGS. 11A, 11B, and 11C illustrate the designated PID loops for each motor of each axis, as shown. The reference point for Pitch and Yaw is determined by main computing device 106. However, the reference point for Roll is fixed at zero degrees which is its level position. Because not all consumer cameras are the same size and weight, depending on the specific camera the user chooses to use, the PID values for each axis will change. The user can specify what camera is attached to the gimbal and the system will configure the PID values either from its database or by means of automated tuning procedures.

Referring again to FIG. 2, in one embodiment, the system is small, lightweight, and wearable, and the computing hardware abides by such guidelines if they are onboard the system. In another embodiment, the computing required to track the target object (subject target) can also be done off board via remote computing or cloud computing alternatives. The object tracking algorithm 208 (also known as computer vision algorithm) deals with initialization, detection, and tracking of a desired object or person. In one embodiment, its input is the from the computer vision camera 103 located on mechanical gimbal 102.

Figure 12:
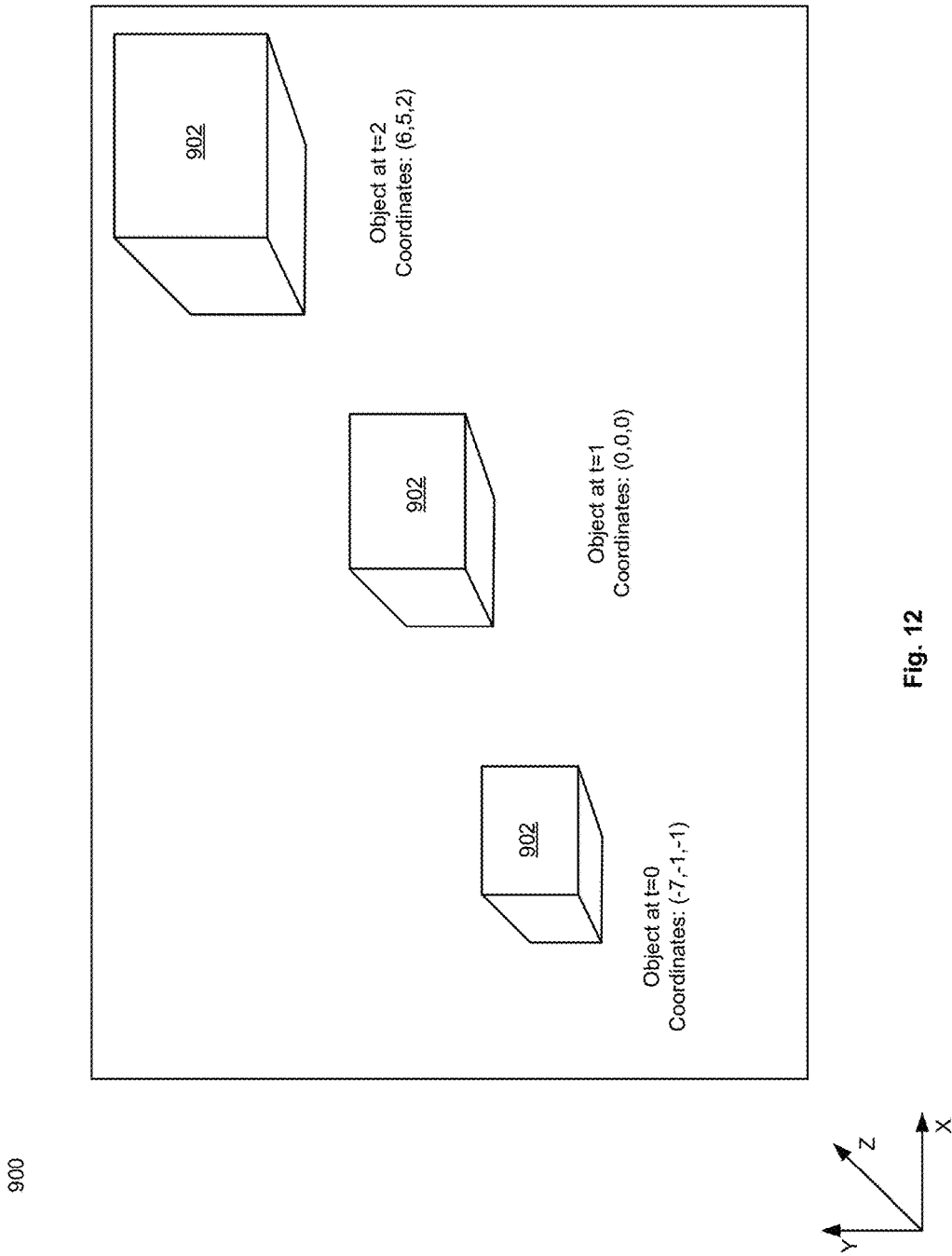
FIG. 12 describes a diagram of, according to an embodiment, the coordinates of a moving object as transmitted by a computer vision camera to the main computing system.

FIG. 12 illustrates diagram 900 that demonstrates the tracking of an object as described in one embodiment. A person of ordinary skill in the art that FIG. 12 is for explanatory purposes only and is not to scale. The purpose for the object tracking algorithm is to track an object and output an X Y and depth (Z) coordinate in reference to the frame of vision seen by a computer vision camera. Considering only the (X, Y) coordinates, the center of the frame will be considered as (0,0). To the right would be a more positive X value and to the left would be a more negative. Above 0 would be a more positive Y value and below would be a more negative value. The depth (Z) coordinate would also be scaled in a similar way, starting at a Z=0, as an object gets smaller it's moving farther away corresponding to a larger negative number. As the object gets larger it's moving closer to the vision camera and corresponds to an increasing positive Z coordinate value.

As shown in FIG. 12, the object 902 (a rectangular block) at time interval (t)=0 is located at coordinates (−7, −1, −1). As time proceeds, object 902 moves. The computer vision camera, at t=1 locates the object at coordinates (0,0,0). At t=2 computer vision camera locates object 902 at coordinates (6,5,2). At each time interval (t), these coordinates are transmitted to main computing system where the object tracking algorithm calculates the position of the object in the three dimensional space and computes the required movements (e.g., pitch, yaw, and/or roll) of a mechanical gimbal as described in embodiments herein. In one embodiment, the depth vector (0,0,d) is treated as am error signal for actuating control purposes and does not participate in actuating the gimbal motors.

Embodiments of a Pivoting Device Control System using an Elementary Tracking Algorithm (ETA) as the object tracking algorithm are described below.

In one embodiment, the object tracking algorithm is an ETA. Based on the signals received from the computer vision camera, the ETA can provide the (X, Y, Z) coordinates to the gimbal tracking control of main computing device. The ETA uses tags and/or beacons to assist the tracking process by being placed on the desired object or person to create a unique and distinct feature.

Figure 13:
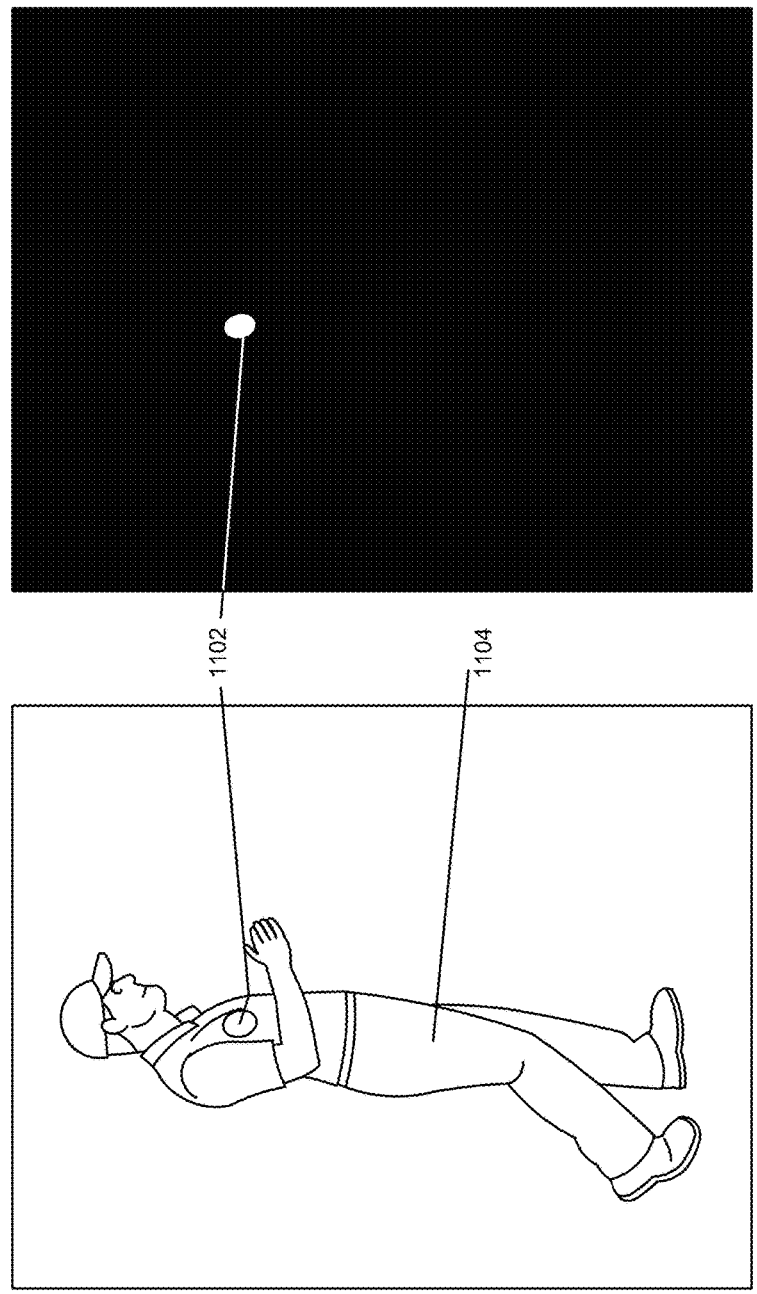
FIGS. 13 A and 13B describe an diagrams of, according to an embodiment, an IR beacon that can be tagged on a subject target to track the subject target's movements.

FIGS. 13A and 13B illustrates diagram 1100 of the pivoting device control system implementing the ETA using a non-modulated Infrared (IR) Beacon, in one embodiment.

A non-modulated IR Beacon is an infrared beacon which is on all the time with constant intensity and is used for a noiseless and minimum noise environment. As illustrated in FIG. 13A, in one embodiment, subject target 1104 is tagged with one or more IR beacon 1102. When observed with a infrared camera with no physical infrared-passing filter the IR light emitted by the beacon is unnoticeable. However, when a physical infrared passing filter is added to the camera lenses, as shown in FIG. 13B, visible light is blocked and the camera can only receive the desired infrared wavelengths allowed to pass through the lenses. Thus, in FIG. 13B, user 1104 is not visible, but IR beacon 1102 can still be seen.

In one embodiment, IR beacon 1102 becomes the ROI to be tracked by the ETA. This allows to easily track the subject target 1104 wearing IR beacon 1102 easily. In this case, IR beacon 1102 can act as a unique marker in the subject target's environment. In one embodiment, the ROI can be big enough to contain IR beacon 1102 from frame to frame even when both the camera and the beacon are in motion. To track IR beacon 1102, a smaller region than the ROI is scanned across the ROI's (x,y) coordinates (e.g., ROI can be a portion of subject target 1104). The pixel intensities are added and the smaller region with the greatest summed intensities is computed as the beacon's location. Based on this information, main computing device can update the ROI every frame so that the mechanical gimbal with mounted camera can center around the beacon's location.

In one embodiment, in order to detect the Z coordinate or depth of beacon 1102, the relative size of the IR beacon is computed at each frame. In one embodiment, multiple IR beacons 1102 can be used to create a specific fixed pattern with the individual IR emitters (e.g., in a diamond pattern, square pattern, etc). The distance between the IR emitters on the beacon can be computed relative to the distance of the beacon away from the camera or the size of the IR emitters. Thus, in this manner the depth or Z coordinate can be computed. In the case of indoors or in the absence of infrared interference, the beacon is constantly on allowing for both vision and infrared sensors to concurrently capture frames together. In such a case, the beacon tracking is dependent upon the vision tracking as it waits for the vision processing to occur before it captures another frame.

In yet another embodiment, a modulated IR Beacon can be used instead of the non-modulate IR beacon described in FIG. 13A. A modulated IR beacon can be used for noisy environments (e.g., outdoors where the sun acts as a powerful infrared source of all wavelengths). In outdoor environments where infrared interferences exist due to the reflection of the sun present in many objects, the constant source beacon is replaced by the robust modulated beacon distinct in modulated rates for every subject. In this case the infrared sensing timing becomes essential and the frame rates differ from the vision tracking, therefore necessitating the two processes to be entirely independent of one another.

Embodied in the infrared image sensor is an infrared filter which allows a particular wavelength to pass, which is also the wavelength of the emitting infrared beacon. The modulated beacon is a blinking infrared light source which is on and off for exactly half the blinking period, thus resembling a perfect square wave. In one embodiment, the IR beacon can be flashing on and off rapidly (blinking or pulsing high and low). In such an embodiment, the computer vision camera equipped with an IR filter needs to operate at least twice as fast as the IR beacon blinking and also fast enough to capture the IR beacon at roughly the same location for at least a few frames, thus allowing the blinking-like behavior to be observed and detected when differentiating the frames. As mentioned, the user is asked to place one or more beacons on the subject to be tracked.

For systems which do not guarantee the desired hard real-time behavior such as Linux based systems, a very accurate timing mechanism with several-nanosecond resolution can be placed to ensure the frames are arriving at consistent intervals. For example, Video For Linux (V4L2) device driver tends to acquire frames at inconsistent intervals, some before the frame period and some after. By placing the precise timer and forcing the acquisition to occur at exactly the frame period, this problem can be solved. Also to reduce the total time it takes to collect the light, one can reduce the exposure parameter using V4L2 controls and also reduce the infrared filter thickness to ensure the image sensor collects the desired infrared light. Another way to obtain consistent frames is using a real-time image sensing interface which stores the image in a buffer until the application obtains it.

Further in other embodiments, noise models can then be added to aid the process of detection by studying the noisy environment and allowing the system to respond accordingly. In one embodiment, the on-off sequences are in terms of the IR beacon physically turning on and off over and over, or varying the intensity of the IR light where an on cycle can be a significantly greater intensity than an off cycle (e.g., pulsing high and low intensities).

In one embodiment, the task for identifying the subject target can be performed based on images of spatial domain of a frame, and is computed by transforming the image to other domains such as the frequency domain or Hough space. Image transforms are applied to the images to convert from one domain to another. Powerful filtering mechanisms can be applied in the latter domains. In various embodiments, common transforms used can include Wavelet transforms, Discrete/Fast Fourier Transforms, Discrete Cosine Transforms, Radon Transform, Hough Transforms or a combination thereof.

Figure 14:
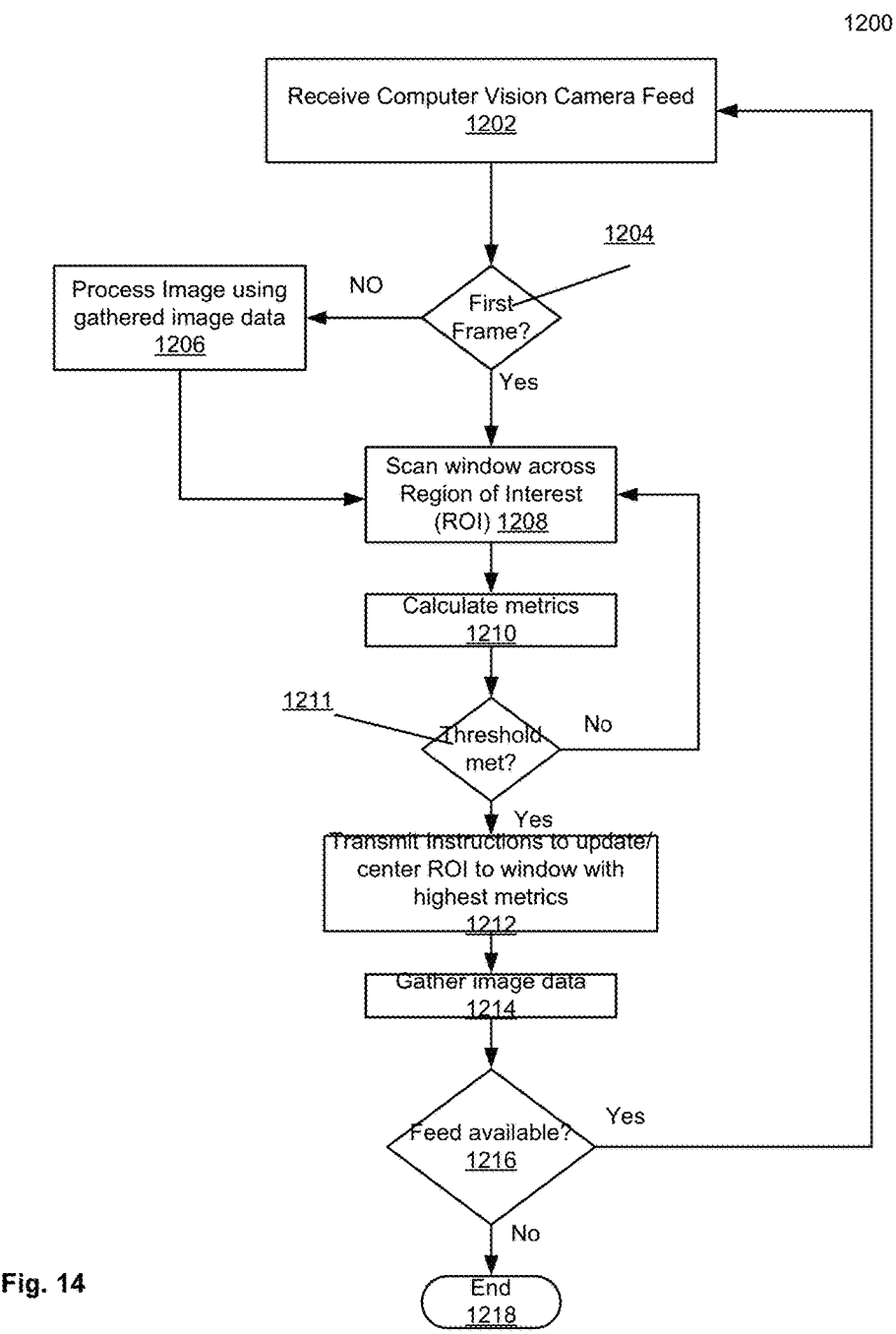
FIG. 14 describes an overview flowchart, according to an embodiment, of a system implementing an infrared beacon tracking algorithm that can be used by the pivoting device control system.

FIG. 14 illustrates an overview flow charts of an embodiment using an infrared beacon based tracking algorithm. As illustrated, at 1202 the system receives a current frame from a computer vision camera (e.g., infrared camera). If this is the first frame, then at 1204, control passes on to 1208 where a window scan is performed over the RIO. If however, it is not the first frame, then the image is processed using previously gathered image data, as illustrated at 1206. At 1210 metrics are calculated. At 1211 it is determined if a determined threshold is met. If not, control passes back to 1208 and the window scan is performed again. However, if threshold is met, instructions are transmitted to the gimbal stabilizer controller to update the POI to the window having the heist metrics, as shown at 1212. At 1214 the image data is gathered for comparison, as shown as 1206. At 1216 a new frame is captured, if available, and control loops back to 1202. If it is determined that the feed is not available the process terminates as 1218.

Figures 15, 16:
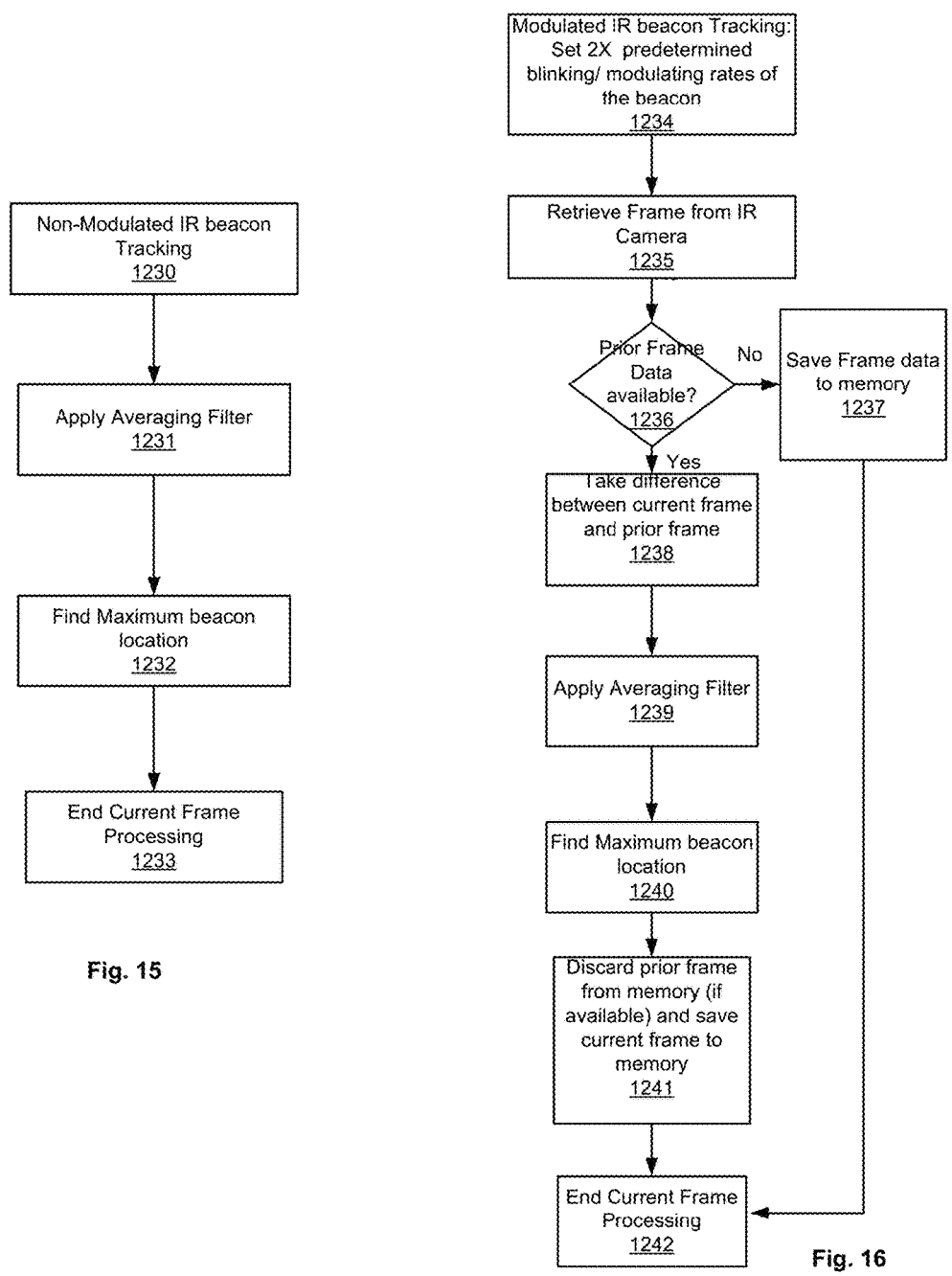
FIG. 15 describes a frame processing flowchart, according to an embodiment, of a system implementing an infrared beacon tracking algorithm in a non-modulated IR beacon setting, that can be used by the pivoting device control system, in one embodiment.
FIG. 16 describes a frame processing flowchart, according to an embodiment, of a system implementing an infrared beacon tracking algorithm in a modulated IR beacon setting, that can be used by the pivoting device control system, in one embodiment.

FIG. 15 describes a frame processing flowchart, according to an embodiment, of a system implementing an infrared beacon tracking algorithm in a non-modulated IR beacon setting, that can be used by the pivoting device control system, in one embodiment.

The metrics applied and the processing of image discussed in FIG. 14 are described in detail herein. For non-modulated IR beacon tracking, 1230, an averaging filter is applied on the frame as shown at 1231. A person of ordinary skill in the field of linear algebra and image processing would appreciate that an averaging filter would assist in determining the beacon location based on finding the maximum value. Thus, as 1232, the maximum beacon value is determined. Since this location informs the system of the present location of the beacon, at 1233 processing of the current frame ends.

FIG. 16 describes a frame processing flowchart, according to an embodiment, of a system implementing an infrared beacon tracking algorithm in a modulated IR beacon setting, that can be used by the pivoting device control system, in one embodiment.

In a modulated IR beacon tracking used in a infrared-noisy environment, the camera's frame rate is set to twice the predetermined blinking or modulating rates of the beacon, as represented at 1234. At 1235 a frame is retrieved from the IR Camera/Sensor. At 1236 it is determined if a prior frame is available in memory, as represented at 1237. If, at 1237 it is determined that the frame retrieved was the first frame, processing of the frame is terminated. On retrieval of the next frame, the frame received at 1237 represents the prior frame. When frame data is available, at 1238, then a difference between the current frame and the prior frame is taken, prior to applying the averaging filter data at 1239. At 1240 the maximum beacon value is determined, and at 1241 the prior frame data is discarded and the current frame data is saved instead (and is considered as the prior frame for processing of the next frame). At 1242 processing of the frame is terminated.

Figure 17:
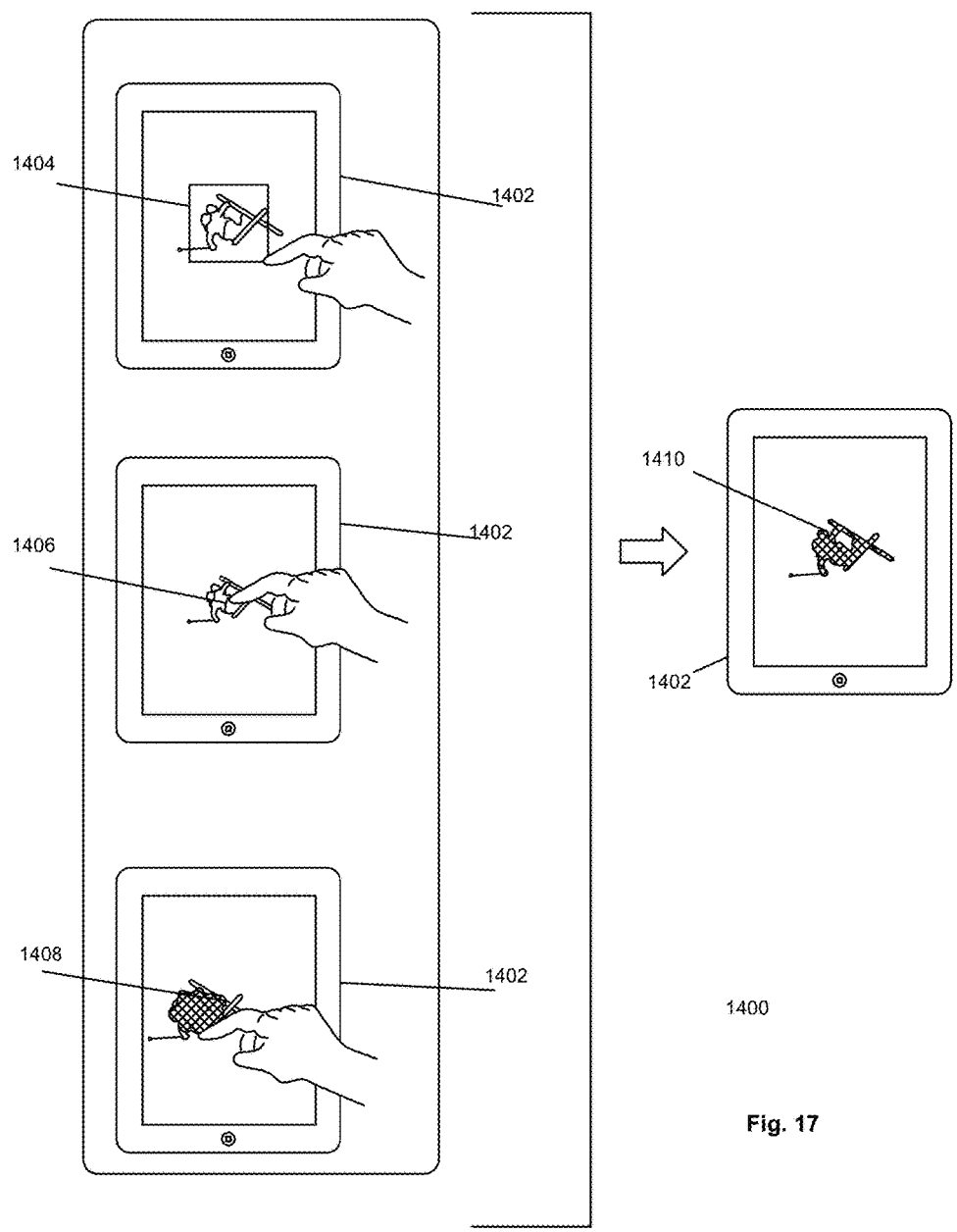
FIG. 17 describes a diagram, according to various embodiments, illustrating different ways a target object can be selected for tracking.

FIG. 17 illustrates diagram 1400 used as the machine interface used to select a target object used by the first algorithm, in one embodiment. In one embodiment, a user initializes a target object. In one embodiment, this can be done by selecting the target object by either drawing a rectangle, tapping the center of the target object area, or painting the target object area using a machine interface device (e.g., tablet). As shown in FIG. 17, a user can either select a rectangular region 1404 on tablet 1402, can tap object 1406 on tablet 1402, or can paint at least a part of the target object. In either case, the first algorithm can include methods or functions that can select the target object. After that, the first algorithm can refine the selected area with one of the graph optimization techniques, such as Graph-Cut or Belief Propagation. Then, the algorithm can calculate the centroid of the refined area, and decide on the rectangular area to track.

FIG. 18 illustrates diagram 1500 implementing feature extraction, as used in one embodiment of the present invention. Once the target object area is selected as referred by 1502, features of the target object can be computed. In one embodiment, features are computed using a Histogram of Oriented Gradients (HOG) algorithm as shown at 1504. Optionally, features can be extended by combining HOG. The extracted features can then, optionally, be saved in a repository and in one embodiment represented as shown in graph 1508. Once the target object area is selected, features of the target object can be computed. A feature, as described herein, can contain color information from RGB color, space of reduced domain, a local Histogram of Oriented Gradients (HOG), a histogram of local binary patterns (LBP), or a combination thereof. More specifically, the HOG can be calculated from either differentiation or Garber filter response. Also, depth information from depth camera can guide the position of the target object.

Figure 19A:
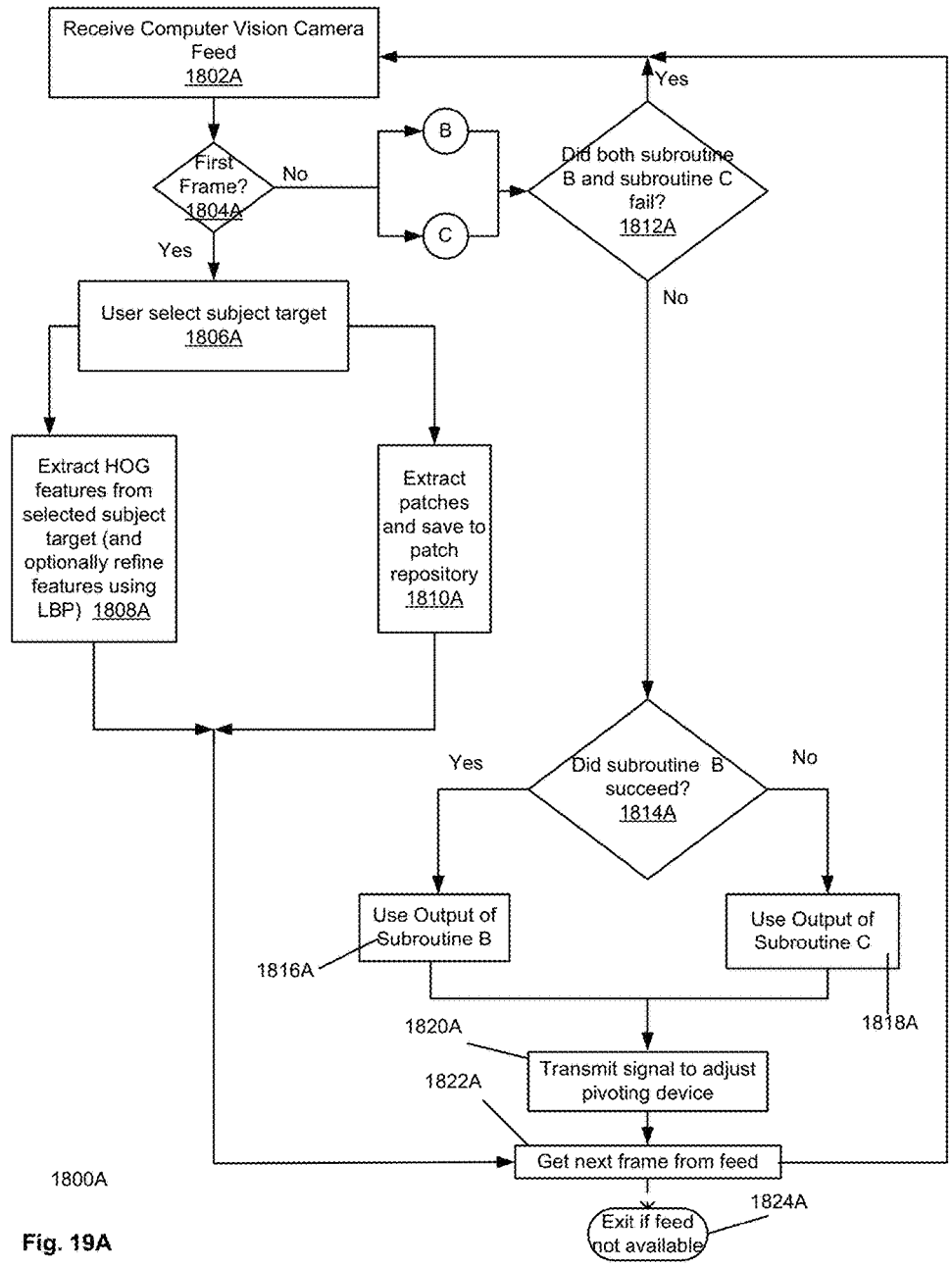
FIGS. 19A, 19B, and 19C describe an overview flowchart, according to an embodiment, of a vision tracking algorithm that can be used by the pivoting device control system to detect features of an object by extracting HOG features.
Figure 19B:
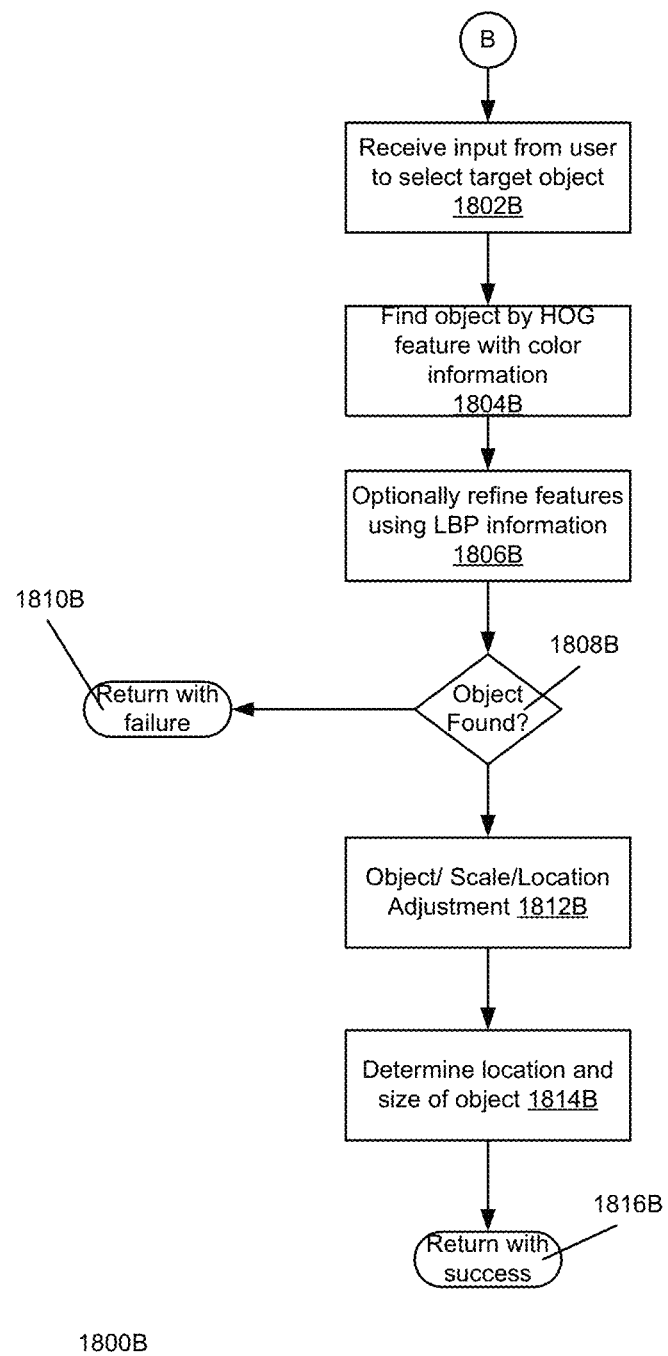
Figure 19C:
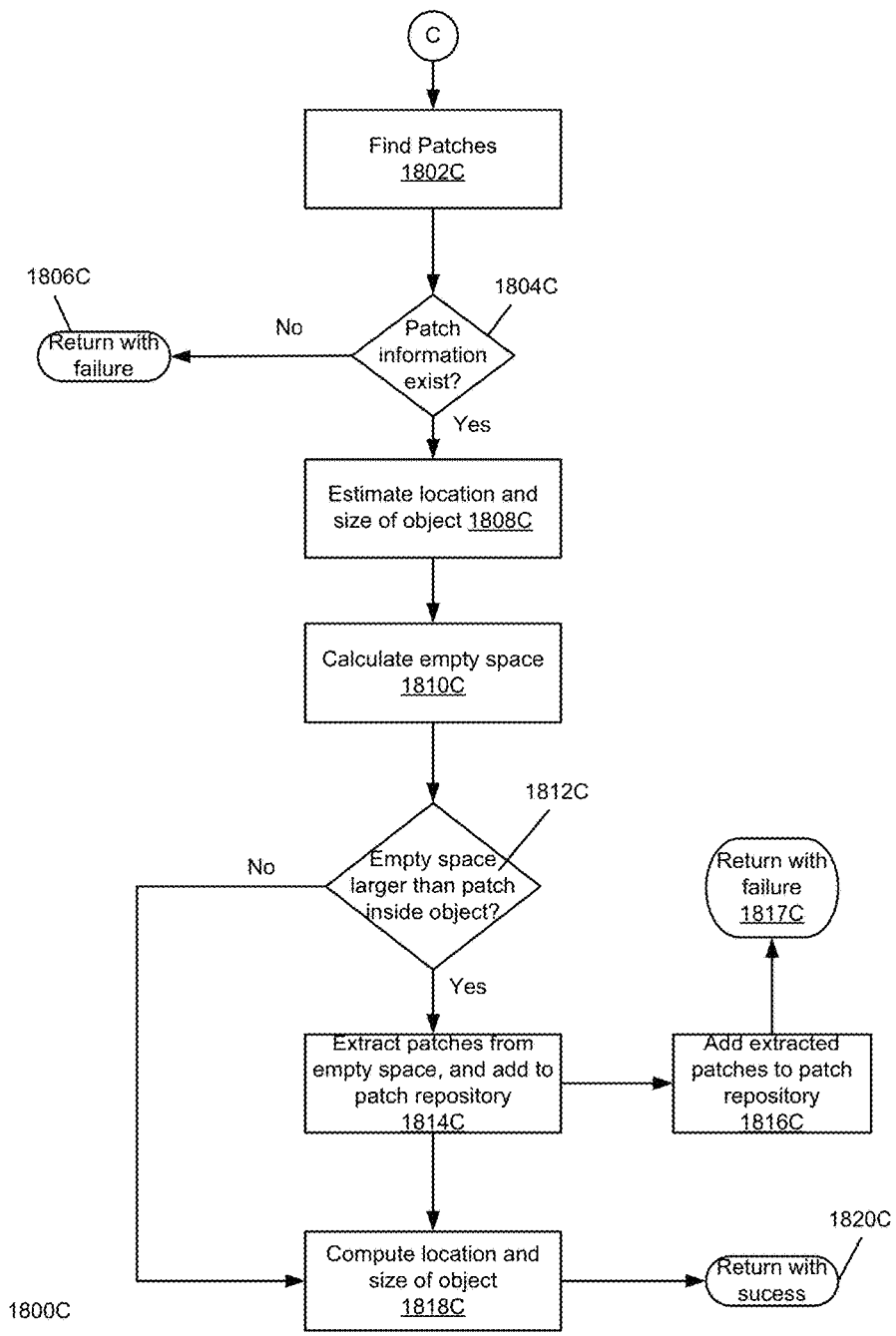

FIGS. 19A, 19B, and 19C describe an overview flowchart, according to an embodiment, of a vision tracking algorithm that can be used by the pivoting device control system to detect features of an object by extracting HOG features.

As illustrated, at 1802A the computer vision camera received a feed. At 1804A it is determined if it is the first frame. If so, at 1806A the user is prompted to select a ROI, that includes the subject. At 1808A the HOG features are extracted from the ROI, and simultaneously at 1810A patches are extracted and saved in a patch repository. At 1822A control passes to get the next frame, and control loops back to 1802A. However, if it is determined at 1804A that the feed's frame is not the first frame, the system needs to begin tracking the subject target. For this two subroutines referred to by reference "B" and "C" are computed, as described further in when discussing FIGS. 19B and 19C. If, at 1812A, it is determined that both B and C routine failed, the algorithm attempts to get a new frame feed from the camera, and control loops back to 1802A. However, if it is determined, at 1812A, that at least one routine (amongst B and C) succeeded, then at 1814A it is determined if routine B succeeded. If so, then at 1816A output of subroutine B is used to tack the object and the system instructs the stabilizer controller to adjust the pivoting device accordingly, at 1820A, and the system instructs to get the next frame for continuous tracking of the object. If however, at 1814A, it is determined that subroutine B did not succeed, then output of subroutine C, at 1818A, is used to adjust the pivoting device at 1820A. If feed is not available, the system exists at 1824A.

FIG. 19B illustrates the flowchart for subroutine B as discussed herein. at 1802B, the system receives input selected by the user and processes that information as input. At 1804B, HOG features are extracted. At 1806B, optionally, LBP feature information is processed, although in the preferred embodiment, no LBP information is processed and this step is skipped.

At 1808B, it is determined if the subject target (object) is found, if not at 1810B, a failure is returned. However, if the subject target is found at 1808B, control follows to 1812B where the object location is scaled and location adjustment are performed, based on the distance of the camera and the subject target. At 1814B the location and size of the object is determined to accurately track the subject, and at 1816B success is returned, control then flows as described in FIG. 19A, herein.

FIG. 19C illustrates the flowchart for subroutine C as discussed herein. As noted above, at FIG. 19A, subroutine B and C are processed concurrently, so that if there is failure by one algorithm, the other is expected to track the object. Although tracking by HOG is preferred over tracking by patch information, in case the HOG algorithm returns a failure, the patch information can be used to determine the location of the target subject. As illustrated herein, at 1802C, the patches are processed from the patch repository, if patch information does not exits, at 1806C, a failure is returned. If however patch information is found, at 1808C, the location and size of the object is estimated. At 1810C empty space is computed. At 1812C, if the empty space is determined to be larger than the patch inside the object, then the patches are extracted from the empty space and saved to the patch repository as shown at 1814C and 1816C respectively. The process then terminates indicating a failure at 1817C. If however the empty space is not larger than the patch inside the, the object size and location is computed at 1818C, and success is returned at 1820C.

With the HOG features computed a model is trained for fast learning, training and detection of the target subject. In one embodiment, the model is trained using the base sample (positive sample) against several virtual samples (negative samples) obtained by translating it to produce a circulant matrix, this is linear regression. The circulant matrices are made diagonal with a Fast Fourier Transform (FFT) regardless of the base sample vector. This results in efficient computation to perform the FFT on the base sample, instead of mathematically expressing the circulant matrix, to reduce the model computation to an element-wise division of the dot products as illustrated by the following equation:

$$\hat{w} = \frac{\hat{x}^* \odot \hat{y}}{\hat{x}^* \odot \hat{x} + \lambda}.$$

$\hat{W}$ model solution in Fourier Domain where $\hat{W}$ is the learning model in Fourier Domain for a linear sample, $\hat{x}$ is the image sample, $\hat{y}$ is the regression target, which is a location-specific vector, and $\lambda$ is an small experimental (non-zero) value preventing a division by zero. However, in order to use the powerful HOG which consists of high dimensional feature space samples, kernel ridge regression is performed and done with a "kernel trick" on linear regression. The trick is to express the solution as a linear combination of the samples and to write the algorithm in terms of dot-products which are computed using the kernel function (e.g. Gaussian or polynomial). This works assuming the data is circulant and the kernel function preserves the circulant structure, Working out the theorems and proofs the new model gets reduced to the following expression containing the Gaussian auto-correlation of the samples in the Fourier Domain as illustrated by the following equation:

$$\hat{\alpha} = \frac{\hat{y}}{\hat{k}^{xx} + \lambda}$$

$\hat{\alpha}$ model solution in Fourier Domain

Where $\hat{\alpha}$ is the computed training model (referred to as 1615 of FIG. 20B, herein), $\hat{y}$ is the regression target, which is a location-specific matrix, and $\lambda$ is an small experimental (non-zero) value preventing a division by zero, as represented above, and $\hat{k}^{xx}$ represents the Gaussian auto-correlation of samples in the Fourier Domain, as discussed above. The kernel trick turns the model computation from a dot product applied to vectors into a matrix operation involving the new regression target which is a Gaussian shape centered at the object's location. This matrix variable gets divided by the Gaussian auto-correlation added by a small gamma-valued matrix. After the model is computed it is stored in the Fourier domain until the detection phase when it becomes compared against the lastly updated model using the Gaussian cross-correlation. The result is then translated back to the spatial domain where the maximum response determines the updated ROI.

As is standard with correlation filters, the input patches (either raw pixels or extracted feature channels) are weighted by a cosine window, which smoothly removes discontinuities at the image boundaries caused by the cyclic assumption. Additionally, in another embodiment, for each frame, the first algorithm can track the target object without a user's intervention. For each frame, features from the entire image area can be computed, and then be compared with an object estimation function. The object estimation function will be one of absolute difference, weighted absolute difference, or weighted cross-correlation, where the weighs will be updated from frame to frame. Thereafter, the location of the target object of current frame represented by the lowest energy value produced by the function can be computed to extract the features.

FIGS. 20A, 20B, 20C, and 20D describe a detailed flowchart, according to an embodiment, of a vision tracking algorithm that can be used by the pivoting device control system to detect features of an object by extracting HOG features.

Figure 20A:
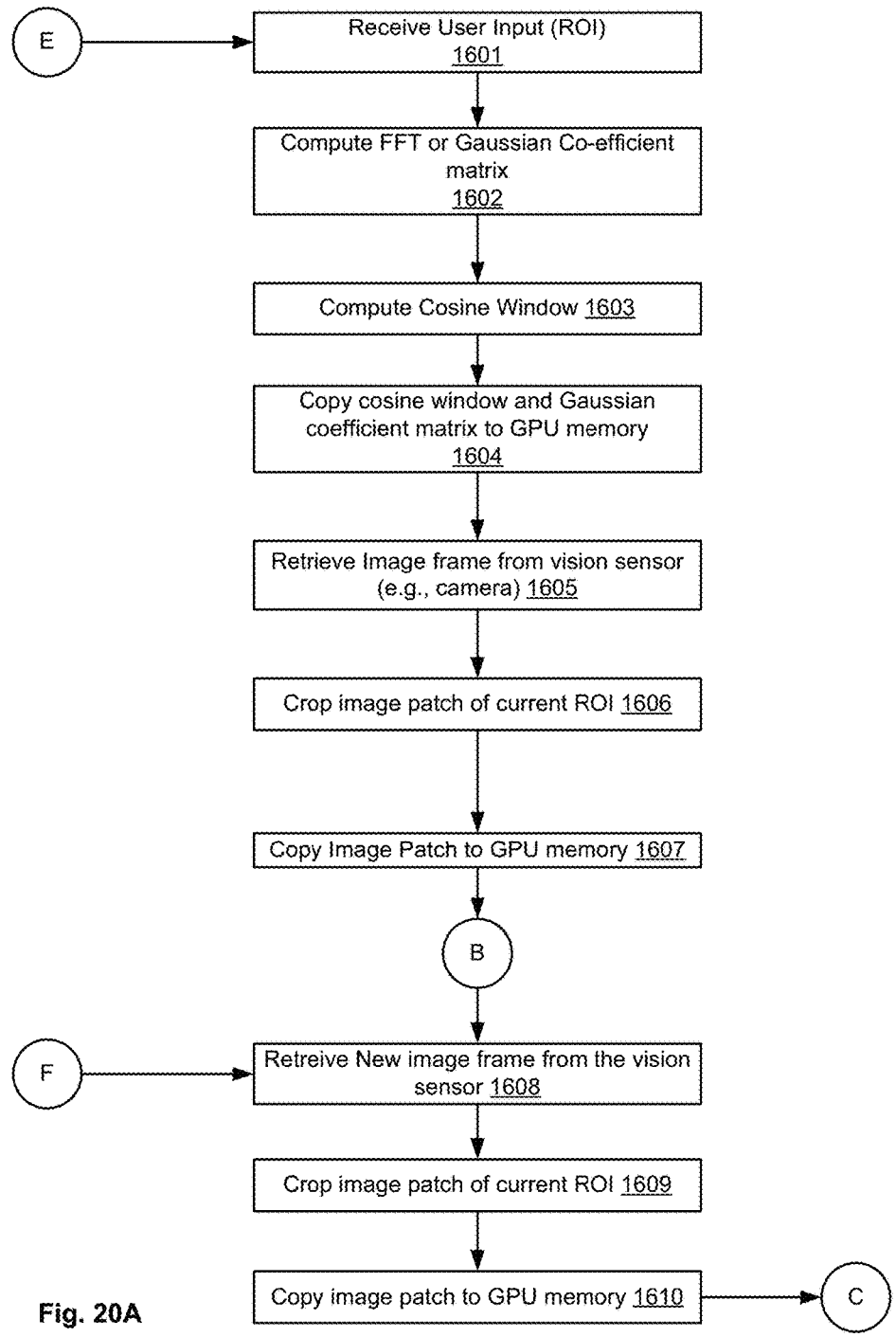
FIGS. 20A, 20B, 20C, and 20D describe a detailed flowchart, according to an embodiment, of a vision tracking algorithm that can be used by the pivoting device control system to detect features of an object by extracting HOG features.
Figure 20B:
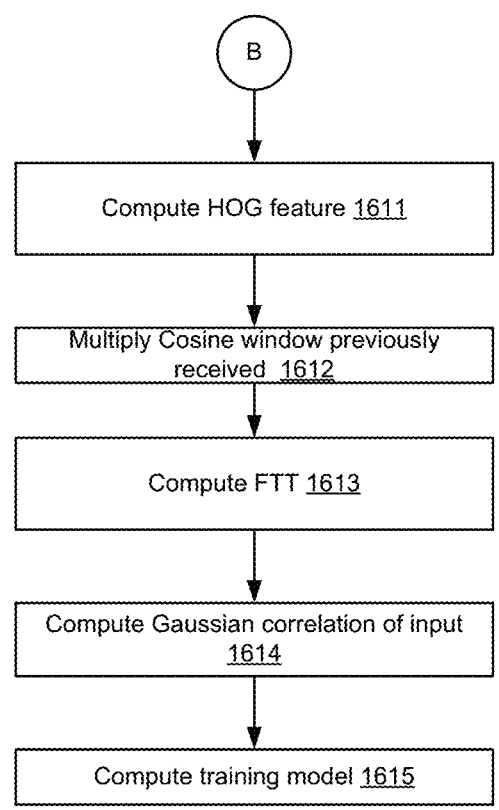

As illustrated in FIG. 20A, at 1601. the system receives user input with the ROI. At 1602, a FFT or Gaussian coefficient matrix is computed. At 1603 a cosine window is computed. At 1604, the cosine window and Gaussian coefficient matrix are copied to GPU memory. At 1605, an image frame is retrieved from the vision sensor. At 1606 the image patch of the current ROI is cropped. At 1607 the image patch is copied to memory. from there control is passed on to Subroutine B as illustrated in FIG. 20B. Referring to FIG. 20B, subroutine B assists in the learning and training of the model. As illustrated, at 1611, the HOG feature is computed. At 1612, the cosine window information (previously copied to GPU memory at 1604) is multiplied with the computed HOG feature data. At 1613, FTT is computed, and at 1614, the Gaussian correlation of the input is computed. At 1615, the training model is computed. Control then continues at 1608, of FIG. 20A. At 1608, a new image frame is retrieved from the vision sensor. At 1609, the image patch is cropped to the current ROI. At 1610, the image patch is copied to GPU memory for further processing. Control is now passed on to subroutine C illustrated at FIG. 20C that assists in tracking of the object.

Figure 20C:
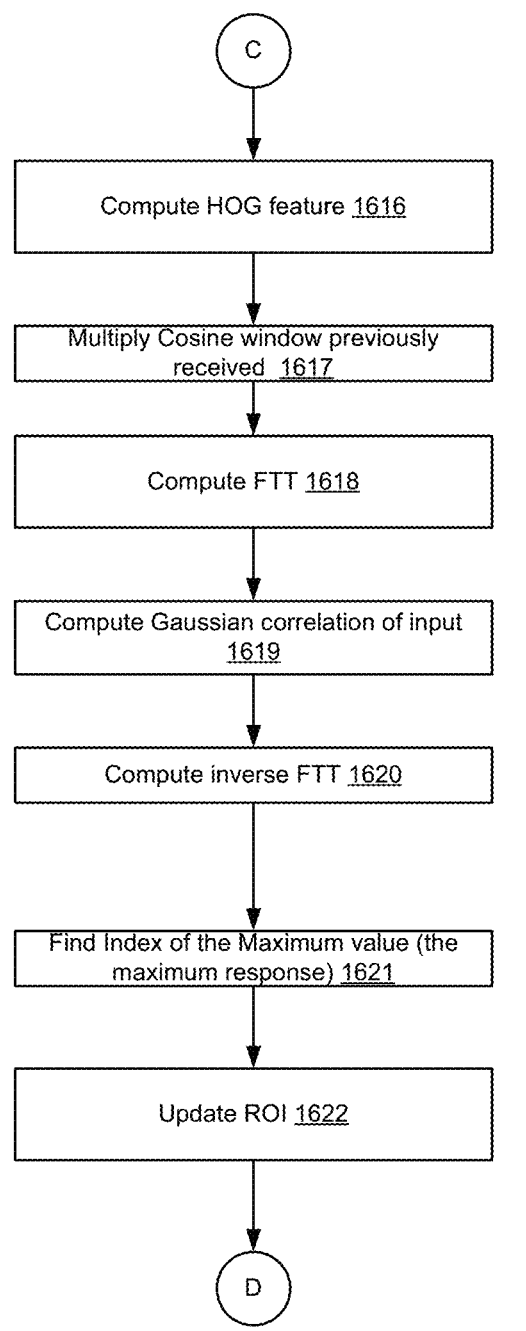
Figure 20D:
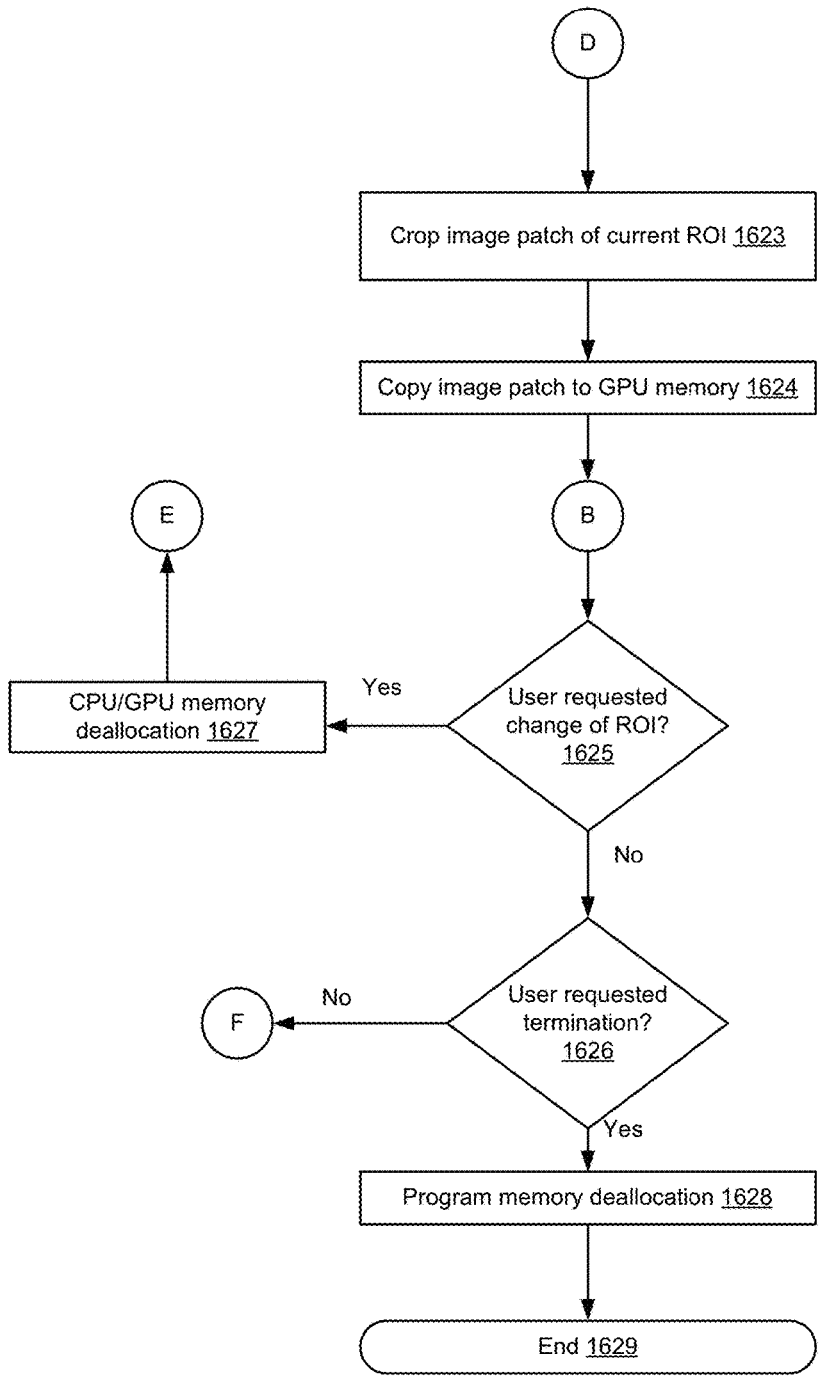

Referring to FIG. 20C, at 1616, HOG features are extracted from the new image frame received at 1608. The cosine window previously copied to memory is multiplied with the HOG feature matrix at 1617, and at 1618 the FTT of the processed data is computed. At 1619, the Gaussian correlation of the input is computed, and at 1620 an inverse of the FTT is calculated. At 1621, the index of the maximum value is selected as the object, and at 1622, the ROI is updated accordingly. Once the ROI is updated at 1623 and 1624, once again the ROI is cropped and image patch is updated in GPU memory, respectively. The system performs another learning subroutine (subroutine B) as discussed in FIG. 20B, and then at 1625 it is determined if the user has requested a change of the ROI. If not, then it is determined if the user has requested a termination of the tracking process. If not, then control passes back to 1608 (FIG. 20A) as discussed above and the process loops through the flow discussed above. IF however, at 1626, the user requested termination, then program memory is deallocated at 1628 and the tracking program exists at 1629. Further, if at 1625 the user requested a change of ROI, then the CPU/GPU memory is deallocated at 1627, and control passes back to 1601 where the process is repeated.

The techniques shown in the figures can be implemented using computer program instructions (computer code) and data stored and executed on one or more electronic systems (e.g., computer systems, etc.). Such electronic systems store and communicate (internally and/or with other electronic systems over a network) code and data using machine-readable media, such as machine-readable non-transitory storage media (e.g., magnetic disks; optical disks; random access memory; dynamic random access memory; read only memory; flash memory devices; phase-change memory). In addition, such electronic systems typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device.

It should be apparent from this description that aspects of the present invention may be embodied, at least in part, in software. That is, the techniques may be carried out in a computer system or other computer system in response to its processor, such as a microprocessor, executing sequences of instructions contained in memory, such as a ROM, DRAM, mass storage, or a remote storage device. In various embodiments, hardware circuitry may be used in combination with software instructions to implement the present invention. Thus, the techniques are not limited to any specific combination of hardware circuitry and software nor to any particular source for the instructions executed by the computer system. In addition, throughout this description, various functions and operations are described as being performed by or caused by software code to simplify description. However, those skilled in the art will recognize what is meant by such expressions is that the functions result from execution of the code by a processor.

Although the computer vision breakthrough using kernel ridge regression has simplified the tracking algorithm from $O(n^3)$ to a near $O(n*\log n)$, the computationally intensive algorithm remains a bottleneck for the CPU and impossible to compute in real-time, 20-50 ms, for ROIs consisting thousands of pixels. The CUDA platform provides the solution to enabling the real-time performance of such massively parallel algorithms by providing hundreds of parallel cores to run simultaneously with the CPU handling serial tasks. Therefore, in one embodiment, GPU implementation of the techniques described herein are based developed on a CUDA Architecture based machine. The CUDA architecture maps the parallel cores into a 2-D grid of blocks, it provides a GPU function with a parameter to call upon N number of blocks to perform the calculations. The function can support more blocks than the parallel cores because each core will execute another block after it finishes its work with the current block. Additionally, each block consist of 1-3 D threads performing simultaneous light work, threads per block is also a supported parameter. Each block and thread have their own unique index informing the function which pixel is being dealt. CUDA provides a simple C/C++ extensions to simplify the usage of its powerful features. CUDA makes available a region of memory called shared memory a copy of the variable is created for each block that is launched on the GPU. Every thread in that block shares the memory but not with threads from other blocks. This shared memory buffer resides physically on the GPU as opposed to off-chip DRAM. The latency to access shared memory tends to be far lower than typical buffers making inter-thread communication effective within every block. A synchronization mechanism, syncthreads( ) is provided to ensure that every thread has reached a certain point in the computation before inter-thread communication can take place. Thus, when computing a dot product the vectors can be broken down into intermediate vectors, each pair of intermediate vector can be passed to a block. Each thread within a block takes a product pair element and places it in shared memory, then syncthreads( ). The block then adds its product pair elements and places the result in global memory where the all intermediate products are added from all the blocks to compute the total dot product.

Shared memory coupled with CUDA atomic operations can be used to implement the HOG algorithm on a GPU. Built inside the atomic operations is a mutex lock which ensures that no two or more pixels can simultaneously write on a single bin in the histogram. The histogram likewise gets computed in two stages, one stage every block computes its intermediate histogram bins using shared memory atomics and stores the result in global memory. The later stage uses global memory atomics to compute the remainder of the histogram.

Page-lock host memory is used for a direct memory transfer from CPU to GPU or vice versa without CPU intervention or page tables. Single CUDA streams allow for simultaneous but differing and orderly functions to run on the GPU. Multiple CUDA streams are used to synchronize the function stages within the streams allowing for more efficient use of the GPU time. Finally, the supported graphics interoperability allows for General Purpose GPU programming and graphics rendering at the same time.

Figure 21:
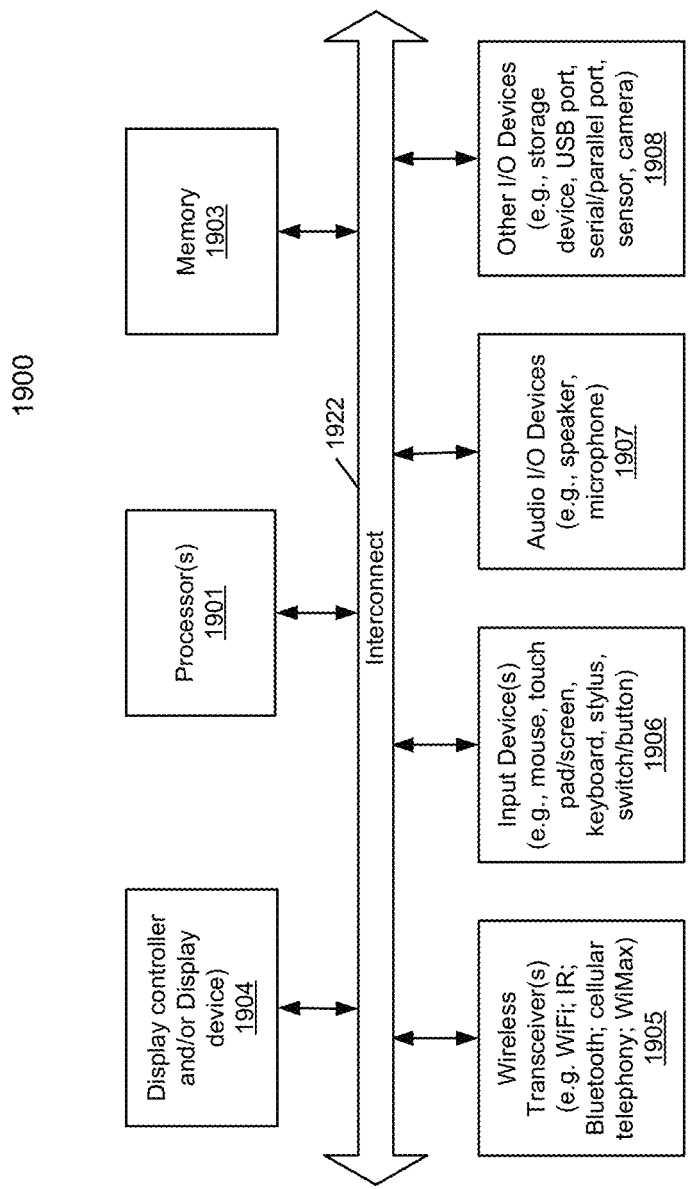
FIG. 21 describes a block diagram illustrating a computing system that can be used with any computing device in various embodiments, as discussed in the innovative subject matter.

FIG. 21 is a block diagram illustrating a data processing system such as a computing system 1900 implemented as part of a pivoting device control system, as described in various embodiments herein. In one embodiment, any of the main computing system 104, gimbal stabilizer controller 106, or machine interface 108, can be represented by system 1900.

System 1900 may have a distributed architecture having dispersed units coupled through a network, or all of its components may be integrated into a single unit. System 1900 can also be implemented as a computing device that assists or performs cloud computing. Computing system 1900 may be implemented as part of a diverse range of products implemented by Cerulean Robotics Inc. For example, computing system 1900 may represent any of data processing systems described above performing any of the processes or methods described above. System 1900 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1900 is intended to show a high level view of many components of the computer system. However, it is to be understood that additional or fewer components may be present in certain implementations and furthermore, different arrangement of the components shown may occur in other implementations. System 1900 may represent a desktop, a laptop, a tablet, a server, a mobile phone, a programmable logic controller, a personal digital assistant (PDA), a personal communicator, a network router or hub, a wireless access point (AP) or repeater, a set-top box, a cloud computing unit, a machine providing SaaS, or a combination thereof.

In one embodiment, system 1900 includes processor 1901, memory 1903, and devices 1905-1908 via a bus or an interconnect 1922. Processor 1901 may represent a single processor or multiple processors with a single processor core or multiple processor cores included therein. Processor 1901 may represent one or more general-purpose processors such as a microprocessor, a central processing unit (CPU), or the like. More particularly, processor 1901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1901 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions. In other embodiments, Processor 1901 can also include, or communicate with a separate graphical processor unit (GPU), such as Nvidia's Kepler GPU with 192 CUDA cores, or any CUDA capable GPUs.

Processor 1901, which may be a low power multi-core processor socket such as an ultra low voltage processor, may act as a main processing unit and central hub for communication with the various components of the system. Such processor can be implemented as a system on chip (SoC). In one embodiment, processor 1901 may be an Intel® Architecture Core™-based processor such as an i3, i5, i7 or another such processor available from Intel Corporation, Santa Clara, Calif. However, other low power processors such as available from Advanced Micro Devices, Inc. (AMD) of Sunnyvale, Calif., an ARM-based design from ARM Holdings, Ltd. or a MIPS-based design from MIPS Technologies, Inc. of Sunnyvale, Calif., or their licensees or adopters may instead be present in other embodiments. In one embodiment, using ARM Cortex A series CPUs highly optimized image processing code can be obtained by utilizing their powerful SIMD NEON instruction.

Processor 1901 is configured to execute instructions for performing the operations and methods discussed herein. System 1900 further includes a graphics interface that communicates with graphics subsystem 1904, which may include a display controller and/or a display device.

Processor 1901 may communicate with memory 1903, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 207-2E (published April 207), or a next generation LPDDR standard to be referred to as LPDDR3 that will offer extensions to LPDDR2 to increase bandwidth. As examples, 2/4/8 gigabytes (GB) of system memory may be present and can be coupled to processor 1901 via one or more memory interconnects. In various implementations the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector.

Memory 1903 can be a machine readable non-transitory storage medium such as one or more volatile storage (or memory) devices such as random access memory (RAM), dynamic RAM (DRAM), synchronous DRAM (SDRAM), static RAM (SRAM), or other types of storage devices such as hard drives and flash memory. Memory 1903 may store information including sequences of executable program instructions that are executed by processor 1901, or any other device. For example, executable code and/or data of a variety of operating systems, device drivers, firmware (e.g., input output basic system), and/or applications can be loaded in memory 1903 and executed by processor 1901. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1900 may further include IO devices such as devices 1905-1908, including wireless transceiver(s) 1905, input device(s) 1906, audio IO device(s) 1907, and other IO devices 1908. Wireless transceiver 1905 may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, network interfaces (e.g., Ethernet interfaces) or a combination thereof.

Input device(s) 1906 may include a mouse, a touch pad, a touch sensitive screen (which may be integrated with display device 1904), a pointer device such as a stylus, and/or a keyboard (e.g., physical keyboard or a virtual keyboard displayed as part of a touch sensitive screen). For example, input device 1906 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO device 1907 may include a speaker and/or a microphone to facilitate voice-enabled functions, such as voice recognition, voice replication, digital recording, and/or telephony functions. Other optional devices 1908 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Optional devices 1908 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1922 via a sensor hub (not shown), while other devices such as a keyboard or thermal sensor may be controlled by an embedded controller (not shown), dependent upon the specific configuration or design of system 1900.

To provide for persistent storage of information such as data, applications, one or more operating systems and so forth, a mass storage (not shown) may also couple to processor 1901. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on RE-initiation of system activities. Also a flash device may be coupled to processor 1901, e.g., via a serial peripheral interface (SPI). This flash device may provide for non-volatile storage of system software, including a basic input/output software (BIOS) as well as other firmware of the system.

Note that while system 1900 is illustrated with various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Thus, methods, apparatuses, and computer readable medium to implement a real-time interactive display system for dynamic object selection and tracking have been provided. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

The invention claimed is:

1. A real-time interactive display system for dynamic object selection and tracking, the system comprising:
   a pivoting device, wherein the pivoting device includes a roll motor, pitch motor, and yaw motor, wherein actuating the roll motor, pitch motor, and yaw motor causes the pivoting device to be operable with at least three degrees of freedom;
   a computer vision camera, wherein the computer vision camera is mounted on the pivoting device;
   a stabilizing controller device coupled to the pivoting device, wherein the stabilizing controller device can actuate the roll, pitch, and yaw motors of the pivoting device; and
   a computing device connected to the stabilizing controller device, wherein the computing device comprises a processing system having one or more cores, the processing system configured to:
   periodically receive a frame from the computer vision camera;
   receive information about a Region Of Interest (ROI) within the frame, wherein the ROI includes a target subject that is tracked in real-time by the computer vision camera, wherein the information includes at least one parameter that can be used to set one or more polygonal boundaries within the frame relative to the target subject, each of the one or more polygonal boundaries defining a region within the frame having an accuracy mode with which the target subject is tracked;
   compute a location and size of the target subject based on the information;
   determine that the target subject is within a first threshold defined by a first polygonal boundary, out of the one or more polygonal boundaries, within the frame;
   in response to determining that the target subject is within the first threshold, set the accuracy mode to a first mode with which the target subject is tracked; and
   transmit instructions to the stabilizing controller device to control the pitch and yaw motors of the pivoting device to adjust the pivoting device based on the first mode such that the subject target is maintained within the frame of the computer vision camera,
in response to determining that the target subject is outside of the first threshold defined by the first polygonal boundary, set the accuracy mode to a second mode with which target subject is tracked; and
transmit instructions to the stabilizing controller device to control the pitch and yaw motors of the pivoting device to adjust the pivoting device based on the second mode such that the subject target is maintained within the frame of the computer vision camera, wherein the second mode instructs the stabilizing controller device to move more rapidly to track the movement of the target subject than in the first mode.

2. The system of claim 1, wherein the stabilizing controller device comprises a microcontroller wherein the stabilizing controller device comprises brushless motor drivers.

3. The system of claim 2, wherein proportional-integral-derivative (PID) loops are executed on the microcontroller of the stabilizing controller, and wherein the PID loops control the roll, pitch, and yaw motors of the pivoting device.

4. The system of claim 1, wherein the pivoting device is mechanical gimbal.

5. The system of claim 1, wherein the pivoting device includes an inertial measurement unit (IMU), wherein the IMU can provide feedback to the stabilizing controller device using which the pivoting device is maintained in a stabilized and leveled manner with respect to the target subject, and wherein the stabilizing controller device directly controls the roll motor based on feedback received from the IMU.

6. The system of claim 1, wherein the information about the ROI is received using at least one of a vision based tracking algorithm or an infrared beacon based tracking algorithm.

7. The system of claim 1, wherein the ROI is received from a user operating a machine interface, the machine interface connected to the computing device.

8. A method to dynamically select and track a subject interactively, the method comprising:
periodically receiving, by a computing device, a frame from a computer vision camera;
receiving information about a Region Of Interest (ROI) within the frame, wherein the ROI includes a target subject that is tracked in real-time, wherein the information includes at least one parameter can be used to set one or more polygonal boundaries within the frame relative to the target subject, each of the one or more polygonal boundaries related to an accuracy mode with which the target subject is tracked;
computing a location and size of the target subject based on the information;
determining that the target subject is within a first threshold defined by a first polygonal boundary, out of the one or more polygonal boundaries, within the frame;
in response to determining that the target subject is within the first threshold, setting the accuracy mode to a first mode with which the target subject is tracked; and
transmitting instructions to a stabilizing controller device to control at least one motor of a pivoting device to adjust the pivoting device such that the subject target is maintained within the frame of the computer vision camera in real-time;
in response to determining that the target subject is outside of the first threshold defined by the first polygonal boundary, setting the accuracy mode to a second mode with which target subject is tracked; and
transmitting instructions to the stabilizing controller device to control the pitch and yaw motors of the pivoting device to adjust the pivoting device based on the second mode such that the subject target is maintained within the frame of the computer vision camera, wherein the second mode instructs the stabilizing controller device to move more rapidly to track the movement of the target subject than in the first mode;
wherein the pivoting device includes a roll motor, pitch motor, and yaw motor, and wherein actuating the roll motor, pitch motor, and yaw motor causes the pivoting device to be operable with at least three degrees of freedom, and wherein the computer vision camera is mounted on the pivoting device, and wherein the stabilizing controller device is coupled to the pivoting device, and wherein the stabilizing controller device can actuate the roll, pitch, and yaw motors of the pivoting device, and wherein the computing device is connected to the stabilizing controller device.

9. The method of claim 8, wherein the stabilizing controller device comprises a microcontroller and brushless motor drivers.

10. The method of claim 9, wherein proportional-integral-derivative (PID) loops are executed on the microcontroller of the stabilizing controller, and wherein the PID loops control the roll, pitch, and yaw motors of the pivoting device.

11. The method of claim 8, wherein the pivoting device is a mechanical gimbal.

12. The method of claim 8, wherein the pivoting device includes an inertial measurement unit (IMU), wherein the IMU can provide feedback to the stabilizing controller device using which the pivoting device is maintained in a stabilized and leveled manner with respect to the target subject, and wherein the stabilizing controller device directly controls the roll motor based on feedback received from the IMU.

13. The method of claim 8, wherein the information about the ROI is received using at least one of a vision based tracking algorithm or an infrared beacon based tracking algorithm.

14. The method of claim 8, wherein the ROI is received from a user operating a machine interface, the machine interface connected to the computing device.

15. A non-transitory computer readable medium comprising instructions which when executed by a processing system executes a method to dynamically select and track a subject interactively, the method comprising:
periodically receiving, by a computing device, a frame from a computer vision camera;
receiving information about a Region Of Interest (ROI) within the frame, wherein the ROI includes a target subject that is tracked in real-time, wherein the information includes at least one parameter can be used to set one or more polygonal boundaries within the frame relative to the target subject, each of the one or more polygonal boundaries related to an accuracy mode with which the target subject is tracked;
computing a location and size of the target subject based on the information;
determining that the target subject is within a first threshold defined by a first polygonal boundary, out of the one or more polygonal boundaries, within the frame;

in response to determining that the target subject is within the first threshold, setting the accuracy mode to a first mode with which the target subject is tracked; and transmitting instructions to a stabilizing controller device to control at least one motor of a pivoting device to adjust the pivoting device such that the subject target is maintained within the frame of the computer vision camera in real-time;

in response to determining that the target subject is outside of the first threshold defined by the first polygonal boundary, set the accuracy mode to a second mode with which target subject is tracked; and transmit instructions to the stabilizing controller device to control the pitch and yaw motors of the pivoting device to adjust the pivoting device based on the second mode such that the subject target is maintained within the frame of the computer vision camera, wherein the second mode instructs the stabilizing controller device to move more rapidly to track the movement of the target subject than in the first mode;

wherein the pivoting device includes a roll motor, pitch motor, and yaw motor, and wherein actuating the roll motor, pitch motor, and yaw motor causes the pivoting device to be operable with at least three degrees of freedom, and wherein the computer vision camera is mounted on the pivoting device, and wherein the stabilizing controller device is coupled to the pivoting device, and wherein the stabilizing controller device can actuate the roll, pitch, and yaw motors of the pivoting device, and wherein the computing device is connected to the stabilizing controller device.

16. The non-transitory computer readable medium of claim 15, wherein the stabilizing controller device comprises a microcontroller and brushless motor drivers.

17. The non-transitory computer readable medium of claim 16, wherein proportional-integral-derivative (PID) loops are executed on the microcontroller of the stabilizing controller, and wherein the PID loops control the roll, pitch, and yaw motors of the pivoting device.

18. The non-transitory computer readable medium of claim 15, wherein the pivoting device is a mechanical gimbal.

19. The non-transitory computer readable medium of claim 15, wherein the pivoting device includes an inertial measurement unit (IMU), wherein the IMU can provide feedback to the stabilizing controller device using which the pivoting device is maintained in a stabilized and leveled manner with respect to the target subject, and wherein the stabilizing controller device directly controls the roll motor based on feedback received from the IMU.

20. The non-transitory computer readable medium of claim 15, wherein the information about the ROI is received using at least one of a vision based tracking algorithm or an infrared beacon based tracking algorithm.

* * * * *